(12) United States Patent
Ciardullo

(10) Patent No.: US 9,457,398 B2
(45) Date of Patent: Oct. 4, 2016

(54) SPHERICAL CENTRIFUGE

(76) Inventor: Jean-Paul Ciardullo, New York, NY (US)

(*) Notice: Subject to any disclaimer, the term of this patent is extended or adjusted under 35 U.S.C. 154(b) by 399 days.

(21) Appl. No.: 13/134,575

(22) Filed: Jun. 10, 2011

(65) Prior Publication Data

US 2012/0312494 A1    Dec. 13, 2012

(51) Int. Cl.
 *B22D 13/04* (2006.01)
 *B22D 23/06* (2006.01)
 *B22D 27/15* (2006.01)
 *B29C 41/06* (2006.01)

(52) U.S. Cl.
 CPC .............. *B22D 13/04* (2013.01); *B22D 23/06* (2013.01); *B22D 27/15* (2013.01); *B29C 41/06* (2013.01)

(58) Field of Classification Search
 None
 See application file for complete search history.

(56) References Cited

U.S. PATENT DOCUMENTS

| | | | |
|---|---|---|---|
| 948,541 A | 2/1910 | Coleman | |
| 2,184,257 A | 12/1939 | Nakagawa | |
| 2,811,747 A | 11/1957 | Belz | |
| 2,814,657 A | 11/1957 | Labino | |
| 2,967,329 A | 1/1961 | Friedland | |
| 3,095,260 A * | 6/1963 | Ferriot | 264/311 |
| 3,202,745 A * | 8/1965 | Ringdal | 264/113 |
| 3,246,069 A | 4/1966 | Maynord | |
| 3,347,971 A | 10/1967 | Mankowich | |
| 3,416,193 A * | 12/1968 | Freeborn | 425/143 |
| 3,652,760 A | 3/1972 | Petri | |
| 3,734,665 A * | 5/1973 | Guillaud | 425/174 |
| 3,754,852 A * | 8/1973 | Rempel | 425/429 |
| 3,782,795 A * | 1/1974 | Richey et al. | 384/463 |
| 3,788,792 A * | 1/1974 | Suzuki | 425/429 |
| 3,856,452 A | 12/1974 | Amado, Jr. | |
| 3,929,182 A * | 12/1975 | Amado, Jr. | 164/114 |
| 4,029,302 A | 6/1977 | Winterhager et al. | |
| 4,043,721 A * | 8/1977 | Lemelson | 425/116 |
| 4,050,875 A | 9/1977 | Katzman et al. | |
| 4,183,883 A * | 1/1980 | Blair | 264/40.1 |
| 4,238,537 A | 12/1980 | Kerr | |
| 4,294,793 A | 10/1981 | Takazawa | |

(Continued)

FOREIGN PATENT DOCUMENTS

EP  0 219 094 A1  4/1987
GB  1011423 A  * 12/1965

(Continued)

OTHER PUBLICATIONS

Christian Augustin and Wolfgang Hungerbach, "History and Production of Hollow Sphere Structures", Chapter 2 of "Multifunctional Metallic Hollow Sphere Structures", Published by Springer (Berlin, Germany 2009).

(Continued)

*Primary Examiner* — Kevin E Yoon
*Assistant Examiner* — Jacky Yuen

(57) ABSTRACT

Devices are disclosed for the high speed centrifugal casting of one or more spheroids. One or more hollow spherical molds are each caused to rotate at high speed about two substantially perpendicular axes intersecting at the center of the mold. Where the mold is partially filled with casting material, a hollow spheroid having walls of even thickness results. Where the mold is filled with multiple casting materials with different densities, the resulting spheroid will have a core that is less dense than its outer layers. Such spheroids are useful as sporting goods, bearing balls, insulation material, and in numerous other applications.

25 Claims, 14 Drawing Sheets

(56) References Cited

U.S. PATENT DOCUMENTS

| | | |
|---|---|---|
| 4,303,732 A | 12/1981 | Torobin |
| 4,331,828 A | 5/1982 | Schlienger |
| 4,357,375 A | 11/1982 | Atkinson, Jr. |
| 4,357,394 A | 11/1982 | Khandros |
| 4,632,654 A * | 12/1986 | Lemelson ................ 425/150 |
| 4,695,244 A | 9/1987 | Friesen |
| 4,775,000 A | 10/1988 | Ayers |
| 4,830,083 A * | 5/1989 | Nakamura ................ 164/35 |
| 5,156,818 A | 10/1992 | Manchak, Jr. et al. |
| 5,171,346 A | 12/1992 | Hallett |
| 5,303,682 A | 4/1994 | Donahue et al. |
| 5,385,950 A | 1/1995 | Mahler |
| 5,500,287 A | 3/1996 | Henderson |
| 5,705,200 A | 1/1998 | Payne |
| 6,101,212 A | 8/2000 | Hugo et al. |
| 6,695,936 B2 | 2/2004 | Johnson |
| 6,787,090 B2 | 9/2004 | Dalton et al. |
| 2010/0012288 A1 | 1/2010 | Marsden |

FOREIGN PATENT DOCUMENTS

| | | | |
|---|---|---|---|
| GB | 1020076 A | * | 2/1966 |
| GB | 1 271 785 A | | 4/1972 |
| JP | 01043277 A | * | 2/1989 |

OTHER PUBLICATIONS

International Search Report for PCT Application No. PCT/US2012/041317 dated Aug. 28, 2012.

* cited by examiner

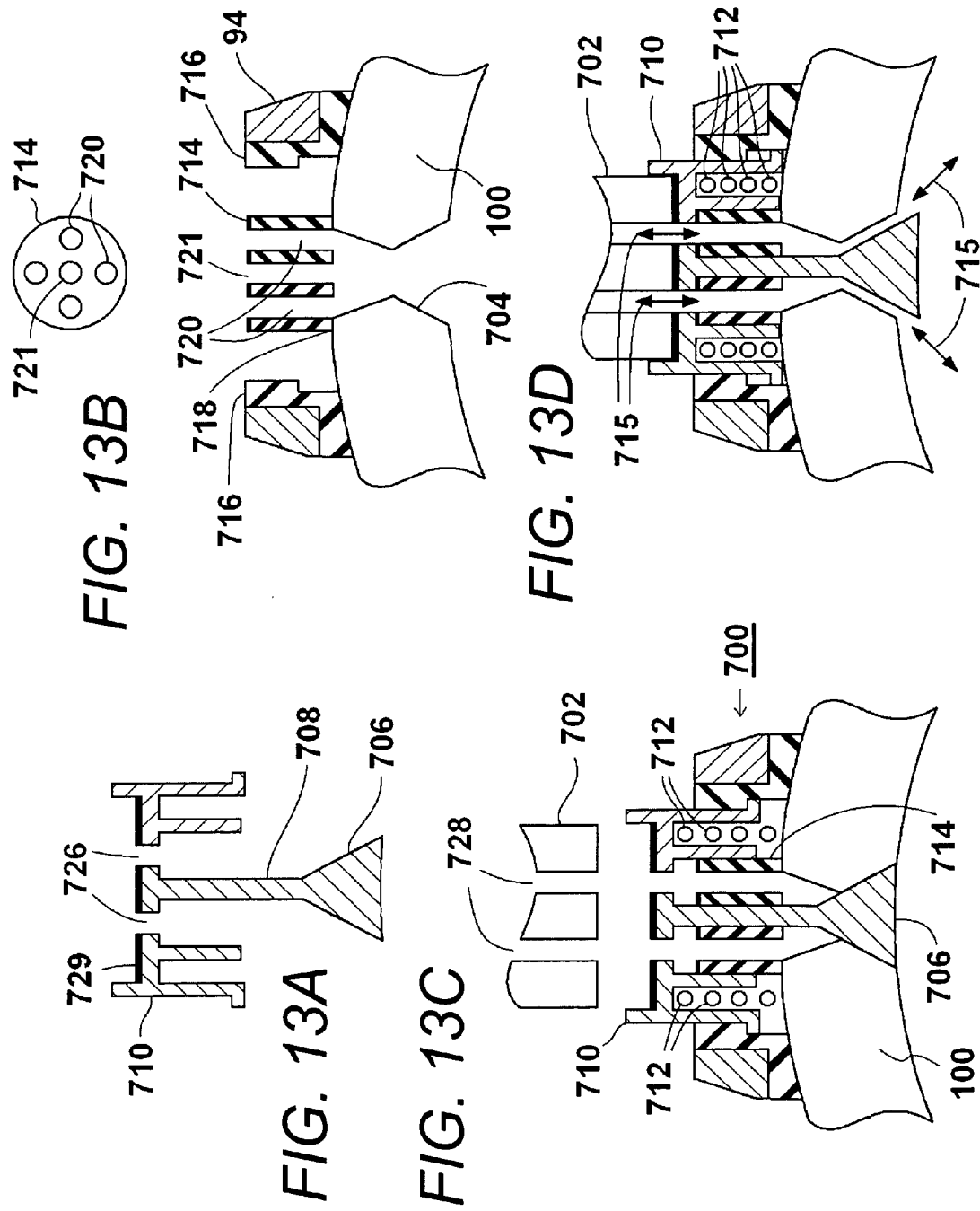

SPHERICAL CENTRIFUGE

The present invention relates to centrifugal casting and particularly to the biaxial centrifugal casting of spheres.

Biaxial centrifugal casting machines typically cause a hollow mold to rotate rapidly about two perpendicular axes which intersect at the center of the mold. This arrangement generates centrifugal forces which drive casting materials from the center of the mold outward toward the inner walls of the mold.

The prior art contains several proposals for centrifugal casting machines for spheres, some biaxial and some not. These prior proposals are believed to be deficient in that they lack any pressure control system to control pressures within the molds; lack any injection ports for casting material; lack adequate temperature control systems, and are not well adapted for mass manufacturing applications. Furthermore, it is believed that they are either very difficult or impossible to use in molding certain types of objects. Moreover, many prior proposals require the use of cumbersome and expensive equipment, and/or are slow and/or inefficient in operation and have other shortcomings, some of which will be discussed below.

It is an object of the present invention to provide centrifugal casting devices and methods which overcome or alleviate the deficiencies of the prior proposals.

Because heat and sound conduction between objects separated by a vacuum is poor, there has long been a demand for methods of manufacturing vacuum insulation paneling for thermal and acoustic applications. The ideal form of such insulation would be two walls spaced a small distance from one another, sealed at the edges, and containing a vacuum. Such a wall would be a highly effective insulator, but would be difficult to manufacture and maintain. Atmospheric pressures acting on the external surfaces of such a wall would be enormous, causing the walls to buckle inward and contact each other, thereby short-circuiting the insulative effect of the vacuum. Additionally, it is difficult to maintain a proper seal on a vacuum panel, and any punctures or ruptures might lead to pressurization of the internal cavity. Though these problems are not insurmountable, the solutions may prove costly or result in a finished product whose size, mass or maintenance is impractical.

Faced with these dilemmas, others have sought to manufacture compartmentalized vacuum panels, sacrificing a certain degree of insulation for the benefit of making a less expensive and more practical product.

It has long been known in the art of vacuum insulation that hollow spheroids containing a vacuum are effective insulators, and may be placed between two materials to reduce heat and sound transfer. As used herein, the term "vacuum sphere" shall include any sphere containing gas at substantially less than ambient pressure, and preferably very low or near vacuum pressures.

Although various methods have been employed or proposed for making vacuum spheres, it is believed that centrifugal casting has not been used for this purpose.

The present invention also includes a method of producing a solid sphere having a gradient internal density, as well as hollow spheres having gradient density walls. Gradient density is achieved by introducing two or more molten or self-hardening spreadable casting materials into a biaxial centrifugal casting machine and using centrifugal forces to collect denser materials near the walls of the mold and lighter materials toward the center. Centrifugal separation of liquid polymer mixtures and molten metal mixtures is known in the art, but, it is believed, has not heretofore been applied to the casting of spheres.

There are at least two advantages of a gradient density sphere that possesses a symmetrical cross-section and an external layer that is denser than its interior: (i) it is lighter than a solid counterpart made entirely of the denser outer layer material and (ii) it will have improved dynamic stability when spun. Such gradient density spheres are useful as lightweight bearing balls, sporting equipment such as golf balls, and in a variety of other applications.

Therefore, it is an object of the invention to provide a centrifugal casting apparatus and methods which produce gradient density spheres.

It is another object of the invention to provide apparatus and methods for centrifugal molding of spheres with centrifugally separated polymers or centrifugally separated metals.

In addition to the foregoing objects, it is an object of the present invention to provide a centrifugal casting device and method that permit the mass manufacture of hollow or solid spheres at a speed, quality and cost competitive with alternative technology.

It is another object of the present invention to provide a centrifugal device and method which permits the manufacture of hollow spheres containing a near vacuum or low air pressure.

It is a further object of the present invention to provide a device and method which permits the manufacture of substantially solid spheres having a gradient internal density.

It is another object of the present invention to provide a device and method which permit the manufacture of hollow spheres having a gradient density wall.

It is a further object of the present invention to provide a device and method to permit the centrifugal casting of high melting-point materials to form hollow or solid spheres.

It is a further object of the present invention to provide a device and method for manufacturing hollow spheres for use as thermal or acoustic insulation.

It is a further object of the present invention to provide a device and method for manufacturing hollow spheres having a highly uniform wall thickness.

It is yet another object of the present invention to provide a device and method for manufacturing hollow vacuum spheres having a relatively thin wall thickness.

It is yet another object of the present invention to provide a device and method for manufacturing hollow spheres lacking any seam.

It is a further object of the present invention to provide a device and method for manufacturing spheres that possess dynamic stability when spun.

It is a further object of the present invention to provide a device and method for manufacturing lightweight bearing balls.

It is a further object of the present invention to provide a device and method for manufacturing high performance sporting goods.

In accordance with the present invention, the foregoing objects are met by the provision of devices and methods for the biaxial centrifugal casting of hollow spheres containing a vacuum or gas at below ambient pressure, as well as the biaxial centrifugal casting of solid gradient density spheres, hollow spheres with gradient density walls, or any other kind of sphere that may be cast centrifugally.

As used throughout this disclosure, the terms "sphere," "spherical," "spheroid," etc. are intended to encompass both true spherical forms, as well as forms which are roughly or approximately spherical. For example, a form that appears roughly spherical to the human eye is encompassed by the aforementioned terminology, as are spherical forms having surface contours.

As used throughout this disclosure, the terms "centrifugal" and "centrifugally" are intended to encompass centrifugal accelerations that exceed the acceleration of Earth's gravity, and which are preferably at least several multiples of Earth's gravitational acceleration. This distinguishes the present invention from certain prior art casting machines which rotate at slow speeds and rely primarily on Earth's gravity to spread casting material within the mold.

As used herein, the concept of causing a casting material to harden encompasses both allowing a self-hardening material to harden and cooling a molten casting material until it hardens.

The inventive device employs one or more hollow spherical molds mounted to a rotating support frame, which frame may be constructed so as to accommodate a long chain of adjacent molds for purposes of simultaneous mass manufacture. In a tandem mold embodiment, multiple molds may be connected to one another by a gear system which translates the spin of each mold to its neighbors. The frame is caused to spin about a first axis by means of first motor, while a second motor engages a rotating gear system that spins the molds mounted within the frame about individual axes substantially perpendicular to the first axis.

The mold(s) of the present invention may employ a valve system to control the flow of gas, liquid and other fluent material into and out of the molds, and to permit hollow objects to be molded containing gas at a low pressure or a near vacuum. Various specially designed joints and bearing mounts permit the valves to be easily opened and closed, and permit the molds to be separated into hemispheres, all under automated machine control, if desired.

Each mold is constructed from two substantially identical hemispheres. Casting material may be added to a mold before casting while the hemispheres are separated. Alternatively, casting material and/or gas may be either injected into or evacuated from each mold by means of one or more valves located on the mold. Counterweighting is employed so that each mold is balanced when spun. Dynamic stabilization devices may also be attached to the machine's frame to increase its stability during operation.

Where the desired casting material is a thermoplastic material, a low-melting point metal, or a self-hardening material, the mold may be made of metal having suitable strength and thermal properties, such as steel or Invar, or any other material with suitable structural tolerances, thermal tolerances, and expansion properties. Heat may be supplied to the mold, for example, by contacting it with a high temperature torch or placing it within a furnace.

Where it is desired to cast material having a high melting point (such as steel or glass), a highly refractory spherical crucible mold may be employed, such as one made of zirconium dioxide or magnesium oxide.

An embodiment of the present invention permits attachment of induction heating coils to heat casting material within such refractory molds. A novel design employs slip fittings to run electricity and cooling fluid to induction coils while the machine is rotating. Various thermally-resistant joints, rotary unions, and bearings permit operation of the device at high temperatures and rotational speeds.

In one mode of operation, the present invention is directed to a novel method for casting hollow spheres containing a vacuum or below ambient gas pressure. Gas may be evacuated from the mold via a valve system before, during or after the injection of casting material. In an alternate embodiment, a vacuum or low pressure environment may be induced in the area sounding the molding apparatus so that molding occurs under vacuum conditions and the resultant spheres contain a vacuum.

The mold is caused to rotate rapidly about two perpendicular axes of rotation that intersect at the center of the mold, forcing casting material against the walls of the mold under centrifugal force.

Where molten casting material is used, heat is removed from the mold once the casting material has been spread. Once the casting material has hardened within the mold, the rotation of the mold is stopped and the hemispheres are separated to allow the finished hollow sphere to be released from the mold. Cooling of molten casting materials may be achieved by ambient cooling or controlled quantities of cooling gas or fluid such as water.

As in all embodiments of the invention, external polishing may be employed to smooth the outer surface of the sphere.

In another mode, the present invention is directed to a novel method for centrifugal casting of solid spheres having a gradient internal density. In yet another mode, the present invention may be employed to centrifugally cast hollow spheres having a gradient density wall.

To cast a gradient density sphere (solid or hollow), a spherical mold is provided that is capable of being rotated simultaneously about two perpendicular axes intersecting at the center of the spherical mold. Casting materials with different densities are introduced into the mold, which mold can alternatively or additionally be heated to melt the casting materials or maintain them at a desired temperature. The mold is then rotated about its two axes to induce centrifugal force on the casting materials, forcing them to separate within the mold, with the highest density casting material moving closer to the walls of the mold, while less dense casting material in forced closer to the center of the mold.

Where molten casting materials are used, heat may be supplied to the mold by a high temperature torch, furnace, or induction heating device. A valve system may be employed to release any trapped or outgassed air within the casting materials. Applying a vacuum to the mold prior to casting will assist in removing outgassed gases from the casting materials.

Alternatively, when casting a hollow sphere, gas can be evacuated from the mold to a pressure sufficiently low to allow the outgassed gases to fill the void while the mold is being rotated, so as to avoid using a relief valve or other means for removing the escaped gases.

In the case of molten casting materials, the mold is permitted to cool after the materials have centrifugally separated. Once the gradient density sphere has hardened within the mold, the mold's hemispheres are separated, permitting the finished sphere to be extracted. Cooling may be achieved by ambient cooling or controlled quantities of cooling gas or fluid such as water.

The foregoing objects and advantages of the invention will be set forth in or apparent from the following description and drawings.

IN THE DRAWINGS

FIGS. 13A-13D are schematic cross-sectional and other views of an alternative valve structure for use in the invention.

PRODUCT SPHERES

Figure 1A:
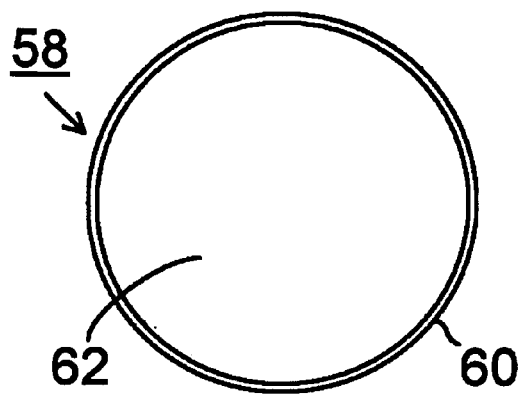
FIG. 1A is a cross-sectional view of a hollow sphere made according to the invention.

FIG. 1A is a cross-sectional view of a hollow sphere 58 made using devices and methods described herein and having a wall 60 and enclosing an internal space 62 having less than ambient pressure.

Figure 1B:
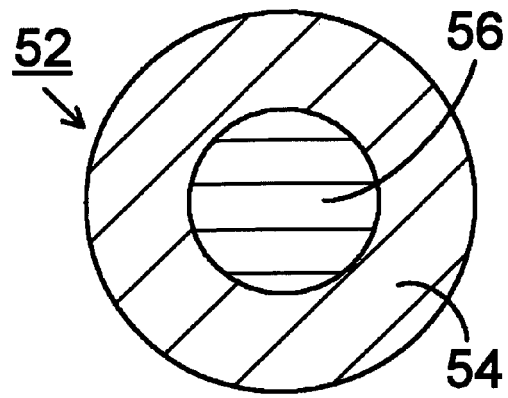
FIG. 1B is a cross-sectional view of gradient density sphere made according to the invention.

FIG. 1B is a cross-sectional view of a solid gradient density sphere 52 made using machines and methods described herein and having an outer layer 54 that is denser than its core 56.

Figure 1C:
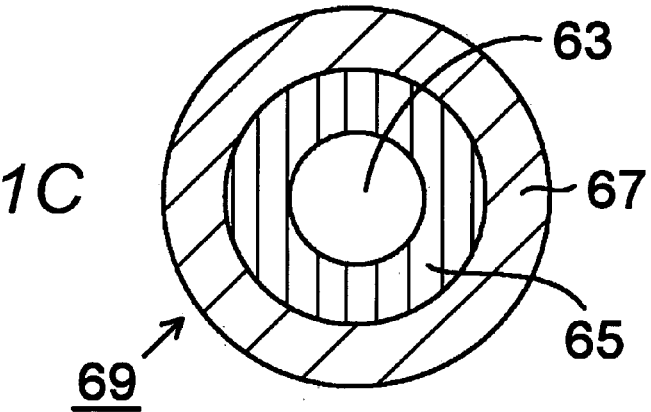
FIG. 1C is a cross-sectional view of a hollow gradient density sphere made according to the invention.

FIG. 1C is a cross-sectional view of a hollow sphere 69 made using machines and methods described herein and having a hollow core 63 and a gradient density wall with outer layer 67 that is denser than inner layer 65.

Figure 1D:
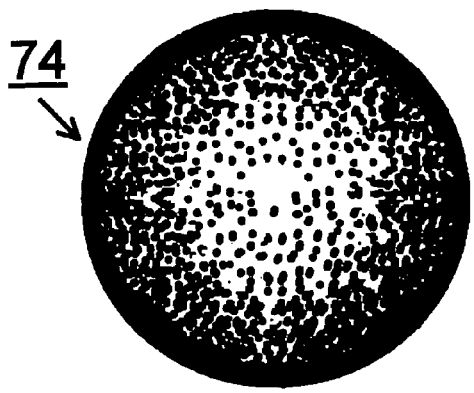
FIG. 1D is a cross-sectional view of a gradient density sphere made according to the invention.

FIG. 1D shows a solid sphere 74 which has been cast so as to have blended layers of increasing density, rather than a sharp transition zone as shown in FIG. 1B. As further explained below, a small void may develop at the center of the sphere as a natural result of the casting process.

Figure 1E:
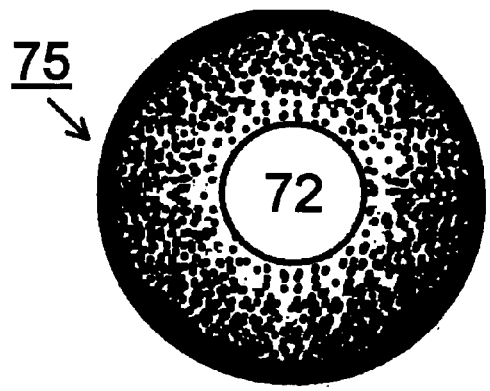
FIG. 1E is a cross-sectional view of a hollow gradient density sphere made according to the invention.

As shown in FIG. 1E, a sphere 75 with hollow core 72 may be cast so as to have blended wall layers of increasing density, rather than a sharp transition zone as shown in FIG. 1C.

Light Duty Casting Machine

An embodiment of the present invention is a light duty biaxial centrifugal casting machine, suitable for molding materials with melting points below about 800° C., such as thermoplastic materials, low-melting point metals, and self-hardening materials. The primary components of this machine may be built of metal or ceramic materials, or other materials possessing suitable thermal resistance, stiffness, and expansion properties.

For example, low expansion metals such as Invar may be used to minimize thermal expansion and contraction effects. Alternatively, ceramic parts with high temperature tolerance may be used for parts of the machine that may be more temperature sensitive. For example, bearings may be made of high temperature-tolerant ceramic materials.

It will be appreciated that the exact dimensions and proportions of the machine may be varied to suit particular needs. For example, the thickness of the machine's parts may be increased to handle heavier duty casting jobs, or decreased to handle lighter duty casting jobs. The walls of the mold should be thick enough to avoid warping at the casting temperature. Gear ratios may also be adjusted to suit particular applications, and the size of the molds relative to the frame may be modified.

If it is desired to cast a spheroid of a particular diameter from molten casting material, or if it is desired to cast a hollow spheroid of a particular wall thickness from molten casting material, care should be taken to anticipate solidification shrinkage and thermal contraction of the casting material, as well as thermal contraction of the mold. Depending on the casting material used, the casting material may undergo solidification shrinkage as it transitions from a liquid to a solid state. Applying centrifugal force during solidification will keep the casting material in contact with the inner walls of the mold, and the solidification shrinkage will manifest as a thinning of the walls of the sphere upon solidification. The solidification shrinkage properties of any given casting material should be considered prior to casting and any necessary allowances made when selecting an appropriate mold size.

The solidified casting may undergo a separate thermal shrinkage as it cools to ambient temperature. It is known in the art of centrifugal casting of cylinders that it is desirable to employ a mold made of a material that will not contract more than the casting upon final cooling, as excessive contraction of the mold might result in damage to the casting and/or the mold, or might prevent easy release of the casting from the mold. Anticipating and compensating for such thermal contraction effects is generally known in the art of centrifugal casting.

Figure 3:
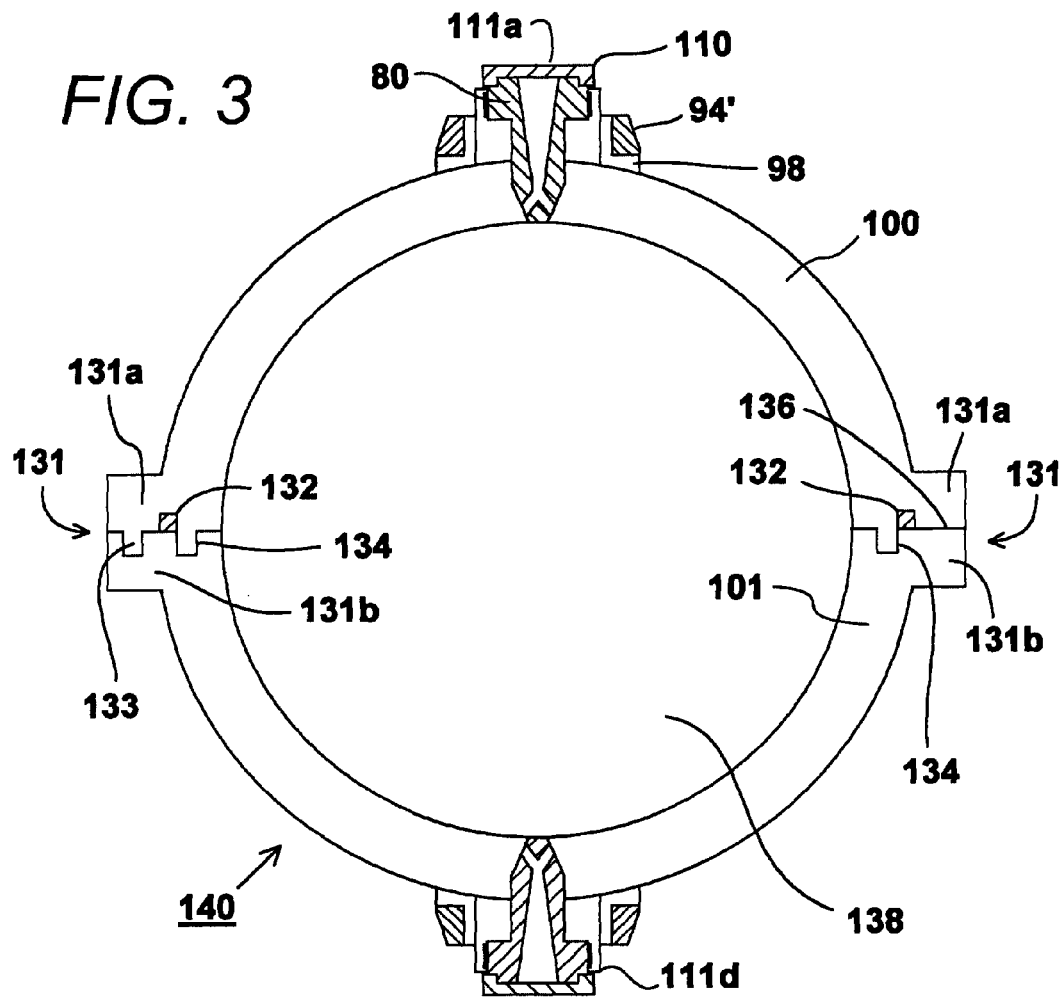
FIG. 3 is a schematic cross-sectional view of a hollow spherical casting mold in accordance with one embodiment of the invention.

FIG. 3 shows a valve structure 111a that is mounted atop one hemisphere 100 of hollow spherical mold 140 made of the hemisphere 100 and another hemisphere 101.

Figure 2A:
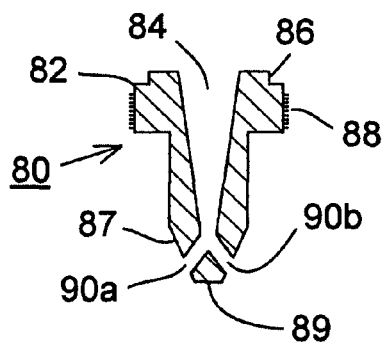
FIG. 2A is a schematic cross-sectional view of a part of a valve used in one embodiment of the invention.

FIG. 2A is a cross-sectional view of a valve 80 that has a hollow interior 84 which splits into side holes 90a and 90b just above a solid bottom portion 89. Valve 80 has a top flange 82 with screw threads 88, and a hexagonal top lip 86 (also see FIG. 2B) which may be engaged by a tool for the purpose of rotating the valve 80 about its long axis to tighten or remove the valve from its mounting, which will be described below.

Figure 2B:
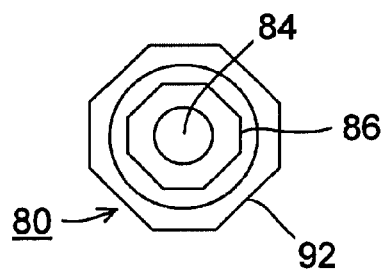
FIG. 2B is a top plan view of the valve part shown in FIG. 2A.
Figure 2C:
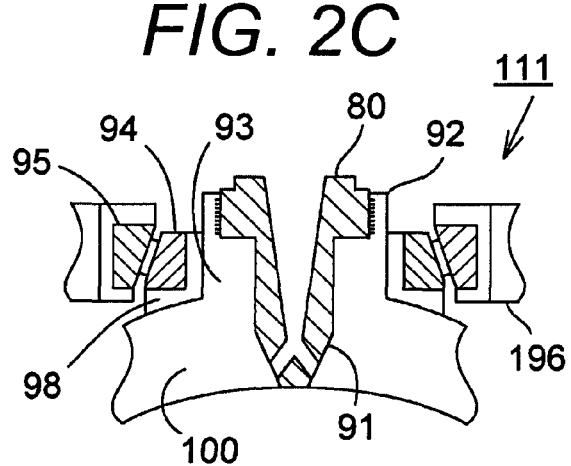
FIGS. 2C-2F are partially schematic, fragmentary, cross-sectional views of a valve system using the valve elements shown in FIGS. 2A and 2B.
Figure 2D:
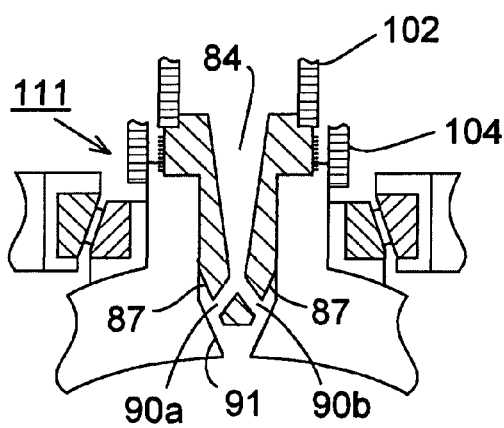

FIG. 2B is a top-plan view of the valve 80 showing central cavity 84 and raised lip 86. As shown in FIG. 2C, hemisphere 100 has an integral neck or boss 93 with an upper hexagonal lip 92. As it is shown in FIG. 2D, lip 92 permits a first tool 104 to hold hemisphere 100 stationary while a second tool 102 engages lip 86 and rotates valve 80 relative to hemisphere 100 to close, open, insert or remove the valve.

FIG. 2C is a cross-sectional view of valve system 111 showing valve 80 screwed down into a vertical projection or boss 93 of the top of hemisphere 100. Note that when valve 80 is completely screwed down into the boss portion 93, the valve portion 87 is seated on the valve seat 91 and bottom 89 of valve 80 is flush with the inner wall of hemisphere 100, creating an air-tight seal.

A heat-insulated mounting ring 98 encircles the boss 93 and permits mounting of a tapered bearing sleeve 94. Tapered bearing sleeve 94 engages a tapered bearing mount 95 which is attached to an outer frame member 196. As will be appreciated, tapered bearing mount 95 not only permits the free rotation of tapered bearing sleeve 94, but also permits tapered bearing sleeve 94 to transfer a high axial load to the frame 196. Thus, the hemisphere 100 is capable of rotating within bearing mount 95 relative to frame 196 while simultaneously transferring its axial load to the frame 196.

The lower portion 87 (FIG. 2A) of the valve is tapered, and the valve seat 91 (FIG. 2C) is tapered at the same angle as the taper of the valve portion 87, so as to form a tight seal when the valve is closed.

FIG. 2D is a cross-sectional view showing the valve 80 after having been unscrewed from boss 93. Tool 104 grips the lip 92 of boss 93, holding hemisphere 100 stationary as tool 102 grips lip 86 of valve 80 and unscrews valve 80 from neck portion 93, thus unseating the valve and opening the conduits 90a and 90b to the interior of the mold 140.

Figure 2E:
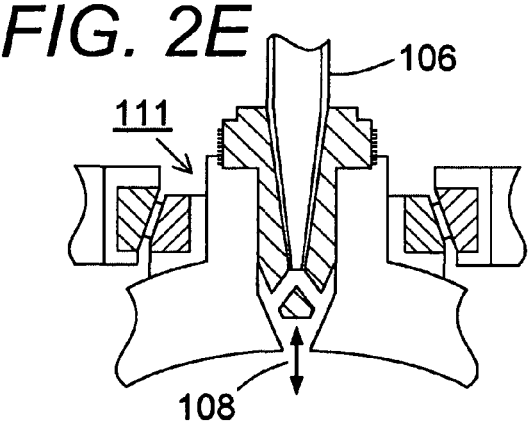

FIG. 2E is a cross-sectional view showing the insertion of a hollow injector/evacuator tube 106 into cavity 84 of valve 80 while valve 80 is partially unscrewed from neck portion 93. When valve 80 is partially unscrewed from boss 93, an opening 108 is created by the unseating of the valve bottom 89 from the inner wall of hemisphere 100. Opening 108 permits the free exchange of gas, liquid or other fluent material through the injector/evacuator tube 106. Alternatively, gas or casting material may be exchanged through valve 80 without the use of the tube 106.

If it is desired to achieve less than ambient pressure within mold 140, evacuator tube 106 may be coupled to a vacuum pump and negative pressure applied while valve 80 is partially unscrewed from boss 93. Upon achieving the desired pressure within mold 140, evacuator tube 106 is used to maintain an air-tight seal on valve cavity 84 while tools 102 and 104 are used to screw valve 80 into a sealed position. This will maintain the desired pressure within mold 140 before evacuator tube 106 is removed. In this embodiment, evacuator tube 106 may have a rotatable nozzle head capable of rotating with valve 80 as valve 80 is screwed into boss 93 to seal opening 108.

Figure 2F:
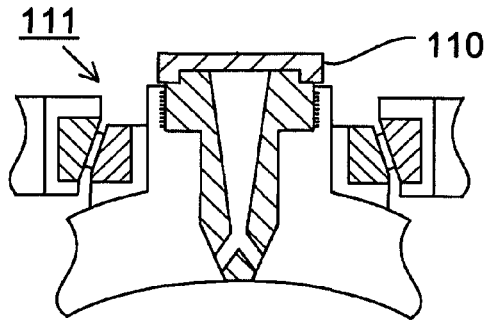

FIG. 2F is a cross-sectional view of valve system 111 with the valve 80 fully screwed down into boss 93 and shut. A supplemental sealing cap 110 may be affixed to the top of valve 80 to ensure an air-tight seal of cavity 84.

The valves shown in FIGS. 2A-2F are capable of being set to fully open, fully closed or intermediate positions to provide an orifice of variable size to allow the flow of fluent materials into or out of the mold 140 at a desired flow rate.

The valves can be operated manually or by means of remotely-wireless-controllable electrical actuators.

It should be noted that the valve system depicted in FIGS. 2A-2F is just one embodiment of a wide variety of valve systems that might be employed to achieve similar results. Certain alternative valve systems are shown in the drawings and described below.

As noted above, FIG. 3 is a cross-sectional view of the hollow spherical mold 140, formed from substantially identical hemispheres 100 and 101. Valve system 111a is mounted at the top of hemisphere 100 and an identical valve system 111d is mounted at the top of hemisphere 101. The valve structures 111a and 111d are identical and are mounted symmetrically with respect to one another to maintain the balance of the mold 140 and minimize vibration while the mold is rotating. Hemisphere 100 has a flange 131a with a lip 134. Lip 134 encircles the entire rim of hemisphere 100 and engages a corresponding groove in flange 131b of hemisphere 101 to create an air-tight seal between the two molds. Flange 131a may have the threaded fasteners or a hinge and clamp (not shown) which secures flange 131a to flange 131b.

If desired, the inner surface of mold 140 may be designed to have certain raised or indented portions, such as dimples, indentations or raised portions, so that the cast sphere will have corresponding surface features.

A gasket 132 is provided to assist in creating an air-tight seal between hemispheres 100 and 101. For high temperature castings, gasket 132 may be made of thermally resistant material such as ceramic fiber. One or more locking pins 133 extend from the rim of hemisphere 100 and mate with corresponding holes in the rim of hemisphere 101. These locking pins 133 ensure that hemisphere 100 is aligned with hemisphere 101 and does not rotate relative to hemisphere 101.

Note that valves 111a and 111d are identical and sit on opposing sides of mold 140, thus preserving the dynamic balance of mold 140 during rotation. Counterweights may also be attached to mold 140 to ensure proper rotational balance.

Figure 3A:
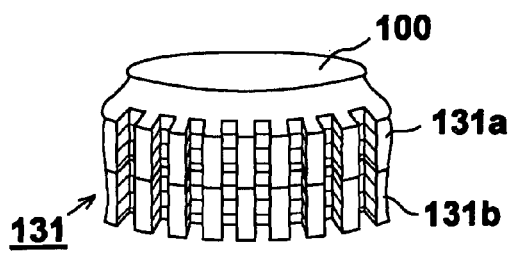
FIG. 3A is a broken-away perspective view of a portion of the structure shown in FIG. 3.

As shown in FIG. 3A, running around the outer rim of hemisphere 100 is gear track 131a, and running around the outer rim of hemisphere 101 is gear track 131b. The grooves of the gear tracks on hemisphere 100 are aligned with the grooves of the gear tracks on hemisphere 101 by virtue of the proper positioning of locking pins 133 relative to corresponding holes in the rim of hemisphere 101.

Figure 3B:
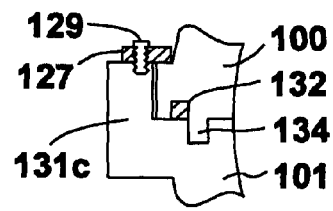
FIG. 3B is a schematic, broken-away, cross-sectional view of an embodiment of a portion of the structure shown in FIG. 3.

In an alternative configuration depicted in FIG. 3B, hemisphere 101 may possess a single gear track 131c that encircles the equator of mold 140. This design may reduce stress along seam 136 during operation. Additionally, an equatorial latch 127 may encircle mold 140 just above track 131c, and may be secured by several screws such as screw 129 along the equator of mold 140. Latch 127 serves the purpose of further securing one hemisphere to the other during operation of the device. Other latching systems are possible, and are within the skill of those familiar with basic mechanical design.

Figure 4:
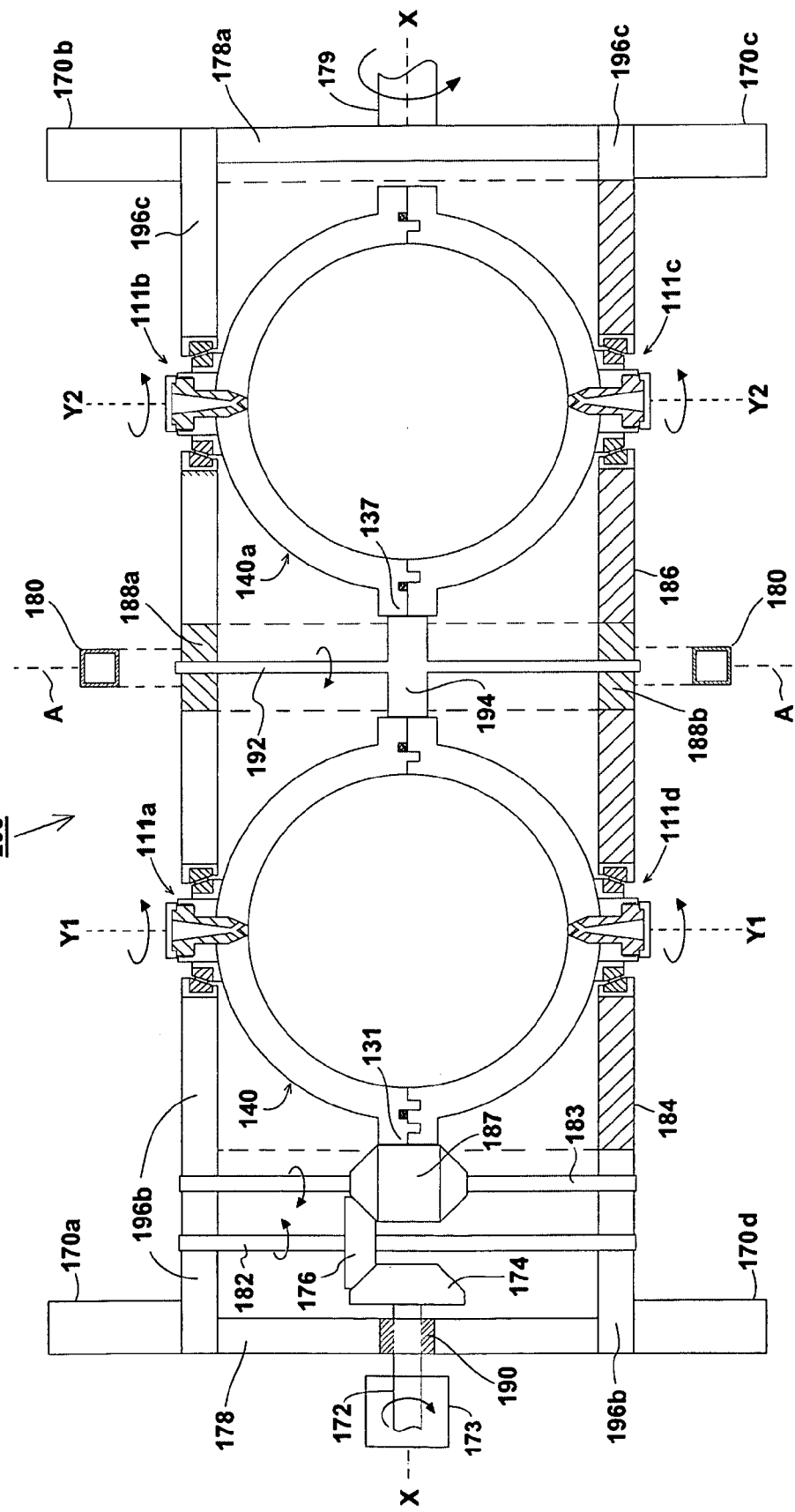
FIG. 4 is a partially schematic, partially cross-sectional view of an embodiment of a casting machine of the invention.

FIG. 4 is a cross-sectional view of a 2-mold light duty biaxial centrifugal casting machine 200. A first hollow spherical mold 140 is secured between an upper wall 196b and a removable lower wall 184. Reducing the spacing between walls 184 and 196a creates an axial pressure along axis Y1 which causes hemispheres 100 and 101 of mold 140 to press against one another, creating an air-tight seal along seam 136. As it is shown by the arrows around axis $Y_1$, mold 140 is capable of rotation about axis Y1. Lower wall 184 may be pulled away from the body of machine 200 to permit the separation of the hemispheres of mold 140 and access to its contents.

A second hollow spherical mold 140a substantially identical to mold 140 is secured between upper wall 196c and removable lower wall 186. Reducing the spacing between walls 186 and 196c creates an axial pressure along axis Y2 which causes the hemispheres of mold 140a to press into each other, creating an air-tight seal. As shown, mold 140a is capable of rotation about axis Y2. Lower wall 186 may be pulled away from the body of machine 200 to permit the separation of the hemispheres of mold 140a and access to its contents.

Figure 5:
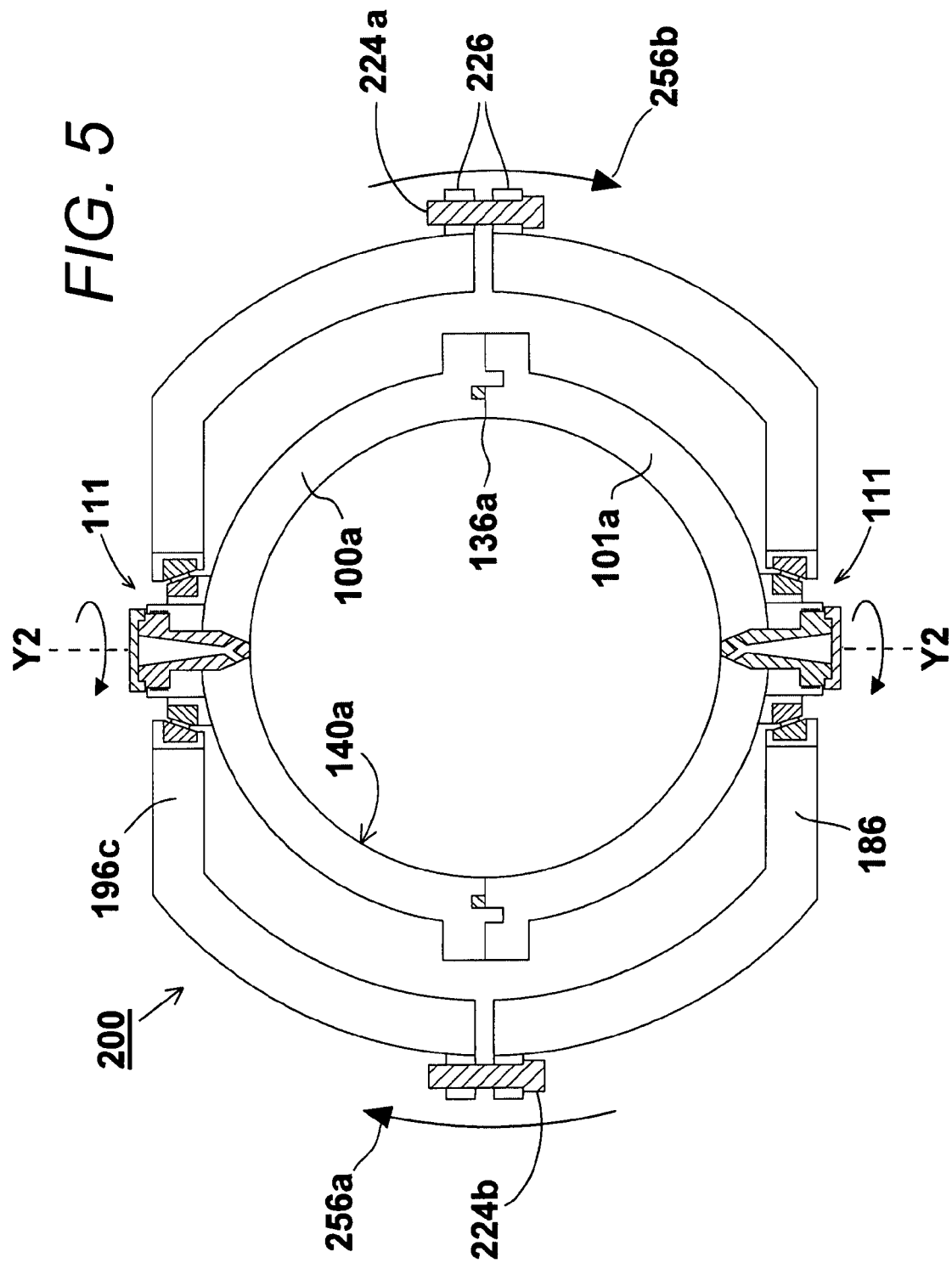
FIG. 5 is a schematic, longitudinal, cross-sectional view of the machine depicted in FIG. 4 taken along axis Y2-Y2.

Walls 196b and 196c are joined to each other by central structure 188. Walls 196b and 196c also encircle machine 200 as shown in FIG. 5, and are adjacent to walls 184 and 186 respectively on the bottom portion of machine 200. Side walls 178 and 178a form the sides of machine 200.

A drive motor 173 drives shaft 172 and a bevel gear 174 is mounted in a bearing 190 in the side wall 178. Bearing 190 permits shaft 172 to rotate freely relative to the frame of machine 200.

A gear system is provided to convert rotary motion of the shaft 172 aligned with the longitudinal axis X-X of the machine 200, into rotary motion of the molds about axes Y1-Y1 and Y2-Y2. The latter axes are perpendicular to the axis X-X.

The gear system includes an axle 182 mounted rotatably between the top and bottom sides of wall 196b, and a bevel gear head 176 which is secured to the axle 182 and meshes with another bevel gear 174 driven by the shaft 172. Another axle 183 is mounted between the top and bottom sides of wall 196b, and has a bevel gear head 187 which engages gear 176 and has gear teeth which engage gear track 131 on mold 140. The system formed by gears 174, 176, 187 and 131 is similar to that of a common automotive differential gear system. The rotation of gear 174 causes gear 176 to rotate, which in turn causes gear 187 to rotate, which in turn forces the movement of gear track 131, causing mold 140 to spin about axis Y1.

It will be appreciated that the capacity of gear 174 to engage and rotate gear 176 is unaffected by the rotation of machine 200 about axis X, and that gear shafts 182 and 183 will remain fixed with wall 196b relative to one another during rotation of machine 200. It will improve the efficiency of operation of the drive motor 173 if shaft 172 is caused to rotate about the X axis of machine 200 in the opposite direction as the frame of machine 200.

A central gear 194 is mounted on an axle 192 which is rotatably mounted to central structure 188 and rotates about axis A. On the side of mold 140 opposite from gear 187, gear 194 engages equatorial gear track 131 on mold 140, as well as equatorial gear track 137 on mold 140a. The rotation of mold 140 about axis Y1 induces the rotation of gear 194 about axis A, which in turn induces the rotation of mold 140a about axis Y2. It will thus be appreciated that the rotation of shaft 172 will induce the rotation of molds 140 and 140a about axes Y1 and Y2 at equal speed, and in the same direction. In an alternative embodiment, gear 194 may be removed and gear tracks 131 and 137 caused to mesh directly with one another.

Mounting struts 170a, 170b, 170c and 170d (as well as additional similar mounting struts not shown) permit machine 200 to be mounted to an external rotating structure or frame 600 (shown in FIG. 8) capable of rotating machine 200 rapidly about axis X. Alternatively, a drive shaft 179 attached at the center of side wall 178a may engage a drive motor (not shown) capable of spinning the frame rapidly about axis X. Fast rotation about axis X induces a centrifugal force within molds 140 and 140a directed outward from axis X.

As explained above, while machine 200 is rotating about axis X, motor shaft 172 causes molds 140 and 140a to rotate about axes Y1 and Y2, respectively, which are perpendicular to axis X. The rotation speed of shaft 172 relative to machine 200 may be adjusted so that the rotation speeds about axes X, Y1 and Y2 are matched. If needed, the rotation of the two motors can be synchronized by means of a servo system. The rotation speed of shaft 172 relative to machine 200 may also be adjusted so that the rotation speeds about axes Y1 and Y2 are different from the rotation speed about axis X, which may be useful for spreading casting material about the mold prior to the final stages of casting.

In an alternative embodiment, rotation of the molds about all axes may be accomplished by rotation of drive shaft 179 by a motor. Rotation of the molds about the axes Y1 and Y2 is accomplished by anchoring the shaft 172 to prevent it from turning while drive shaft 179 is spinning. The box 173 represents an immovable anchoring mass or structure in this embodiment. Not only does this modification save the cost of using one motor, but it ensures synchronization of the rotating motions about the X and Y axes. If the gear ratios of the gears driving the molds are properly selected, the frame and the molds can be made to rotate about the X and Y axes at the same speed.

Central structure 188 permits optional mounting of a dynamic stabilizer 180, shown in FIG. 6 and described below, to reduce vibration and stabilize machine 200 as it is rotated about axis X. It will be appreciated that the design of machine 200 may be easily modified by those skilled in the art to permit the attachment of additional or different dynamic stabilizers either directly to machine 200, or to any rotating structure it may be attached to.

FIG. 5 is a cross-sectional view of light duty biaxial centrifugal casting machine 200 viewed along axis Y2. Arrows 256a and 256b show the direction of spin of machine 200 about the X axis during operation. Upper wall 196c is connected to lower wall 186 by screws 224a and 224b threaded through equatorial rims 226. Additional screws (not shown) may further secure rims 226. Tightening the screws causes walls 196c and 186 to compress hemisphere 100a against hemisphere 101a, forming a tight seal along seam 136a. It will be understood that any of a variety of securing means apart from screws may be employed to secure wall 186 to wall 196c, including, for example, a clamping mechanism.

Figure 6:
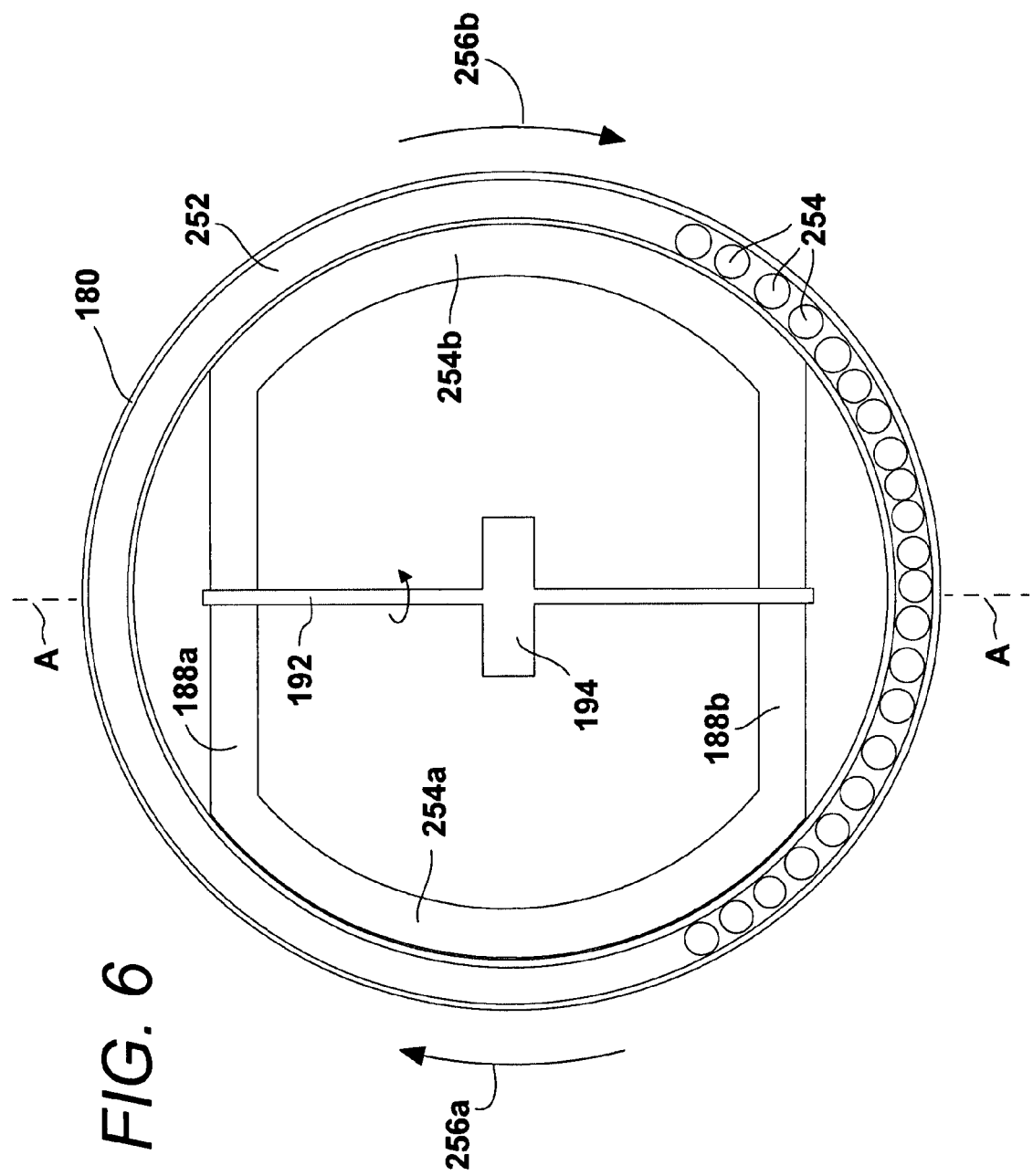
FIG. 6 is a schematic, longitudinal, cross-sectional view of the machine depicted in FIG. 4 taken along line A-A.

FIG. 6 is a cross-sectional view of light duty biaxial centrifugal casting machine 200 viewed along axis A of FIG. 4. Upper wall 188a and lower wall 188b are connected to each other by side walls 254a and 254b. Axle 192 is mounted between walls 188a and 188b and has gear 194 secured to the axle at its center. Dynamic stabilizer 180 may be optionally attached to side walls 254a and 254b. Dynamic stabilizer 180 possesses a hollow core 252 filled with liquid and containing multiple ball weights 254. Arrows 256a and 256b show the direction of spin of machine 200 during operation. This spin causes the fluid and ball weights 254 within dynamic stabilizer 180 to spread out centrifugally, resulting in a stabilizing weight distribution that helps reduce vibration and unwanted motion of machine 200 during operation. Many other forms of dynamic stabilizers are known in the art and may be employed in lieu of stabilizer 180, which is shown here for illustrative purposes only.

Dynamic stabilization devices may alternatively or additionally be applied to any structure attached to machine 200 for purposes of rotating machine 200 about axis X. Counterweights may also be distributed within machine 200 or any rotating mount of machine 200 to ensure proper balance.

Figure 7:
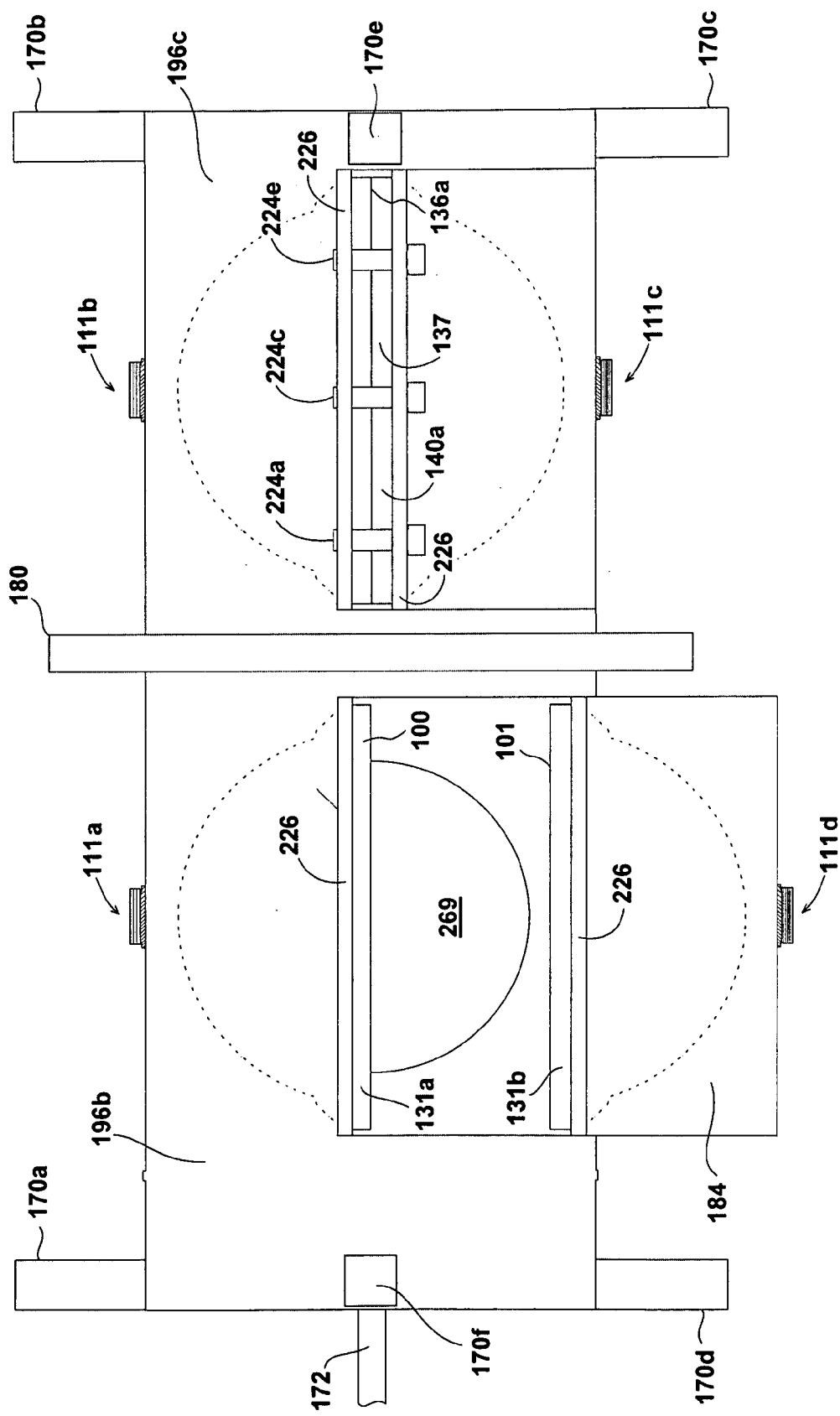
FIG. 7 is a schematic, side elevation view of the exterior of the machine depicted in FIG. 4.

FIG. 7 is a side view of the exterior of machine 200. In this view, additional mounting struts 170e and 170f can be seen, which, in conjunction with corresponding mounting struts on the opposing side of machine 200, and mounting struts 170a, 170b, 170c, and 170d, permit machine 200 to be mounted to an external rotating drum structure 600 (shown in FIG. 8) capable of spinning machine 200 rapidly about axis X. Alternatively, machine 200 may be supported by rollers or similar support structure and caused to spin about axis X by a drive shaft 179 attached to side wall 178a.

FIG. 7 also shows mold 140a sealed within machine 200. Screws 224a, 224c and 224e (along with matching screws 224b, 224d and 224f on the opposing side of machine 200) hold wall 186 firmly against wall 196c such that an air-tight seal is maintained along seam 136a of mold 140a. FIG. 7 also depicts wall 184 pulled away from wall 196b to reveal finished cast sphere 269. Wall 184 may be fully removed to permit sphere 269 to be removed from mold 140. To improve heat exchange between the interior of mold 200 and the external environment, holes may be distributed across walls 196b, 196c, 184 and 186 to the extent that such holes do not sacrifice structural integrity.

Figure 8:
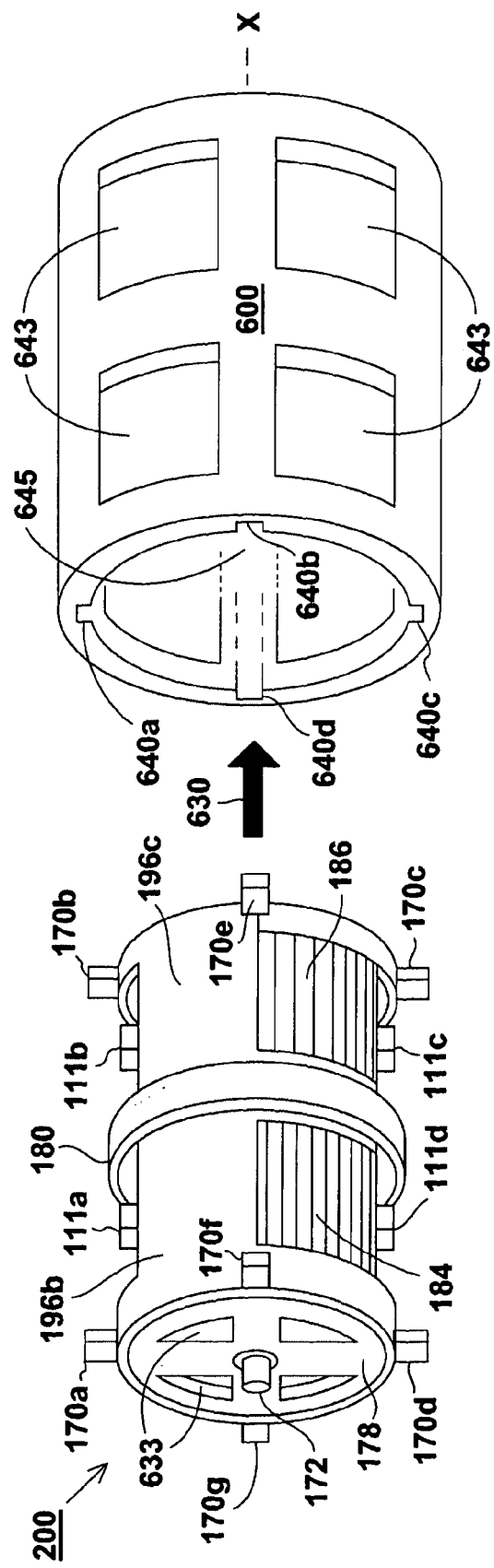
FIG. 8 is a schematic perspective view of the exterior of the machine depicted in FIG. 4, as well as a receptacle for mounting that machine.

FIG. 8 is a perspective view showing how machine 200 may be inserted into rotation drum 600. Drum 600 is located within a machine (not shown) capable of rotating drum 600 about axis X. A heat source, such as a torch or furnace, may be provided in the vicinity of drum 600 to achieve desired melting temperatures within machine 200. Openings 643 in the walls of drum 600 facilitate transfer of heat between machine 200 and the surrounding environment. Openings 633 in side wall 178 of machine 200 perform a similar function. As previously noted, walls 196b, 196c, 184 and 186 may contain holes to further assist in heat exchange.

Struts 170a and 170b slide into groove 640a. Struts 170f and 170e slide into groove 640b. Struts 170d and 170c slide into groove 640c. Struts 170g and 170h (on the side of machine 200 not shown) slide into groove 640d. Machine 200 is slid into cavity 645 of rotation drum 600 as indicated by arrow 630.

Once machine 200 is fully inserted into drum 600, its struts may be firmly secured to the walls of drum 600 by screws, latches, or other common securing means. Drum 600 may then be rotated rapidly about axis X to induce centrifugal force within machine 200 radiating outward from axis X. Motor shaft 172 may be simultaneously engaged to induce rotation of the molds within machine 200 about axes Y1 and Y2. Dynamic stabilization mechanisms known in the art of rotating heavy machinery may be used to minimize vibration and unwanted movement of drum 600 during rapid rotation.

A heat source may be applied in the vicinity of drum 600 to melt the contents of the molds within machine 200 as necessary for casting. For example, the whole of drum 600 may be made to rotate within a furnace having a temperature high enough to melt the contents of the molds, yet low enough not to affect the integrity of the components of machine 200, which, as previously explained, are made of materials with desirable thermal tolerances. Alternatively, a torch or torches of appropriate temperature may be aimed through openings in drum 600 and machine 200 towards the molds with machine 200, providing more localized heating. Other appropriate heating means may be provided as desired by the user. The molds may be allowed to cool slowly under ambient conditions, or may be quenched with controlled amounts of water or other cooling liquid or gas.

It will be appreciated that although a 2-mold embodiment has been described by the foregoing Figures and description, the design of the present invention can be easily modified to accommodate a single mold, or a long chain of multiple molds.

Casting of Hollow Vacuum Spheres with Light Duty Machine

According to an inventive casting method disclosed herein, machine 200 is employed to cast hollow spheres containing low air pressure or a near vacuum. Casting material for this purpose might consist of heated liquid casting material, ambient temperature self-hardening liquid material, or ambient temperature solid material to be melted while within the mold. Machine 200 is designed to cast materials at temperatures below about 800° C., such as thermoplastic materials, self-hardening materials, and low-melting point metals.

To minimize pressurization of hollow vacuum spheres over time, a casting material with low gas permeability should be used. Aluminum is an example of a metal with a relatively low melting point that is classified as an ultra high vacuum material.

Certain thermoplastic materials, such as polyetheretherketone (PEEK) and polytetrafluoroethylene (PTFE), are classified as ultra high vacuum materials because of their low gas permeability and low outgassing rate. Certain other polymer materials, such as polyvinyl chloride (PVC) and chlorinated polyvinyl chloride (CPVC), are useful for vacuum applications, but should be outgassed prior to molding as explained in U.S. Pat. No. 5,425,264. Outgassing may be accomplished, for example, by exposing the casting material to a high vacuum within the mold for an extended period of time before casting, venting gases through the mold's valves. Alternatively or additionally, a coating or layer of material with low gas permeability (such as PEEK) may be applied to a hollow vacuum sphere after molding to prevent the sphere from pressurizing over time.

Prior to casting, a release coating may be applied to the inner surfaces of mold 140 to assist in removal of the product sphere after the completion of casting, and to increase the life of the mold. For relatively low temperature applications, various forms of grease, lubricant or low friction polymer may serve this purpose. For higher temperature metal casting applications, a high temperature coating may be applied, such as graphite, zircon or bentonite. Coatings such as graphite will provide a smoother coating, while coatings such as bentonite will provide a friction coating that will allow the inner surface of the mold to grip the casting material during centrifugal acceleration. Numerous coating materials are known in the art of centrifugal casting of cylinders, and may be selected to serve a particular application.

Prior to application of a mold coating, a mold pre-treatment process may be employed to clean the mold of any debris or unwanted material from a previous casting job. Pre-treatment may involve heating the mold, treating its inner surfaces with a mild etchant, and then washing it out with fresh water. Once dried and wiped, the mold may then be coated with a coating material as previously described.

Casting material may be placed within mold 140 by separating mold 140 into hemispheres 100 and 101 so that casting material (solid or liquid) may be placed within the mold. Hemispheres 100 and 101 may be separated by pulling wall 184 and hemisphere 101 away from machine 200 and hemisphere 100 as shown in FIG. 7. Casting material may then be added. After hemispheres 100 and 101 are re-attached and sealed, mold 140 may be evacuated of unwanted gases by a vacuum pump attached to evacuator 106, coupled to valve system 111a as shown in FIG. 2E.

Rather than separating hemispheres 100 and 101 to insert casting material, liquid casting material may be injected into mold 140 through valve systems 111a and/or 111d while mold 140 is sealed. For example, an evacuator 106 may remove air from within mold 140 via valve system 111a while an injector coupled to valve system 111d injects liquid or casting material into the mold. The timing of the evacuation and injection may be such that casting material is only injected after mold 140 has been adequately evacuated of gases.

Alternatively, if only one valve is provided at the top of mold 140, casting material may be introduced into the mold 140 through the valve, and then gas may be removed from the hollow interior through the same valve, which then is sealed shut. According to a different method, a single valve may be first used to evacuate the mold 140 of gas, and then employed to inject casting material while maintaining a proper seal on the valve to prevent the re-introduction of gases prior to final closure of the valve. If only one valve is used, a counterbalancing weight should be attached to mold 140 to maintain the rotational balance of the mold.

The quantity of casting material used is selected so as to give the finished sphere a desired wall thickness and size of evacuated interior.

Once the casting materials have been introduced into the mold, and before casting begins, sufficient exhaust time should be allowed to permit any unwanted gases to escape from the casting materials. Heating the casting materials and/or exposing them to a vacuum for an extended period of time may promote degassing and reduce later unwanted outgassing of the casting materials. Negative pressure may be applied to the casting materials by provision of a vacuum pump attached to the valve system while the mold is sealed. Degassed gases may also be evacuated through the valve system. For certain casting materials, chemical degassers may alternatively or additionally be added to bond with free gas particles and thereby remove gas from the casting material. Certain molten metals react adversely with oxygen, so casting under vacuum conditions or in the presence of an inert gas may be advantageous when working with such metals.

Alternatively, to absorb gases outgassed from the casting materials, the mold may be evacuated by use of one of the valves described herein before rotation starts. If gas later accumulates during centrifugal motion, such gases will gather in the hollow center of the body being molded and fill the void. Thus, the unwanted gases fill the cast sphere instead of being vented.

Where heated liquid casting material is added to the mold, the casting process may be improved by pre-heating the mold so that the casting material does not immediately cool and harden. Heating of the mold may be accomplished, for example, by exposing the exterior of the mold to flame or placing it within a furnace. Heat should continue to be applied as necessary to keep the casting material liquid during the casting process.

It may be sufficient to heat the casting materials to their desired molten state prior to casting, removing the heat source just before mold rotation begins. In this mode, heat may be applied directly to the molds without subjecting the rest of machine 200 to the stress of unnecessary thermal exposure. Whether additional heat needs to be applied as the molds are rotated will depend on the properties of the casting material and the speed of the casting job.

As is evident, the procedures just described for charging mold 140 with casting material also apply to the rest of the molds in machine 200.

Once molds 140 and 140a are sealed and the casting material inside them suitably prepared for centrifugal casting, machine 200 is caused to spin about axis X by drum 600. Simultaneously, a motor driving shaft 172 will cause molds 140 and 140a to spin about axes Y1 and Y2.

In a preferred embodiment, the rotation speed of the molds about axes Y1 and Y2 are substantially matched to the rotation speed of the molds about axis X. The relative speed of the molds about axes Y1 and Y2 as compared to axis X may also be varied during the early stages of casting to promote even spreading of the liquid casting material within the molds. For certain casting jobs, the user may find that the casting materials may be adequately spread about the inner surface of the mold by oscillating the rotation speed about one axis relative to the other. The objective, of course, is to spread the casting material evenly about the inner surface of the mold.

In the case of casting materials having a highly viscous molten state (such as PEEK and PTFE), it may be advantageous to begin with a solid powder or particulate form of the casting material. Such casting material may be added to the molds by either placing it within separated hemispheres or injection through the valve system. The molds may be sealed, evacuated of gases, and made to spin so as to centrifugally distribute the particles evenly along the inner surfaces of the mold. Applying heat will then sinter or melt the particles, causing them to bond and form a contiguous layer along the inner surface of the mold. Subsequent cooling will harden the layer into a sealed hollow sphere, which may then be removed from the mold.

The amount of time it will take to evenly spread casting material in the molds will depend on a variety of factors, including the rotation speed of the molds, the quantity of casting material, and the physical properties of the casting material at the casting temperature. To reduce casting time, rotation speeds ranging from hundreds to thousands of rotations per minute (rpm) may be employed. One skilled in the art will be able to determine with minimal experimentation what rotation speed and length of casting time is best suited for a particular application. It is anticipated, however, that centrifugal forces of 10 to 200 times the force of gravity (i.e., 10 G-200 G) will be sufficient for most applications.

The centrifugal acceleration G (as a multiple of Earth's gravitational acceleration, g) at a distance r from the center of the hollow spherical interior of the mold may be readily derived from Equation 1:

$$\frac{\pi^2}{900\ g} r\omega^2 = G \qquad \text{(Equation 1)}$$

where
r=the distance from the center of the hollow spherical interior of the mold, in meters, ω=the rotation rate of the mold about a given axis, in revolutions per minute, in RPM, g=Earth's gravitational acceleration, in meters per second per second, and G=centrifugal acceleration as a multiple of Earth gravity ("Gs").

When casting hollow spheres, the relevant centripetal acceleration is that near the surface of the hollow spherical interior of the mold.

In the case of molten casting material, cooling should begin once the casting material has been evenly spread inside the molds and while the molds are still spinning. Cooling may be accomplished by either allowing the molds to cool slowly under ambient temperature conditions, or by quenching the molds with controlled quantities of water, or other cooling liquid or gas. The cooling rate may affect the mechanical properties of the resulting sphere. In the case of metal casting material, slower cooling rates will permit the growth of larger crystals, which tends to improve the strength of the solidified metal.

Once the casting material has suitably hardened, the rotation of the molds may be stopped. Once machine 200 has stopped spinning, it may be removed from drum 600 so that the mold hemispheres may be separated and the hollow vacuum spheres formed therein removed. A machine grip with a friction or suction contact may be required to gently separate the two hemispheres and extract the cast sphere. Polishing may be used to smooth the surfaces of the resultant spheres.

Casting of Gradient Density Spheres with Light Duty Machine

According to an inventive casting method disclosed herein, machine 200 is employed to cast gradient density spheres made from self-hardening materials, or materials with melting points below about 800° C. Such materials include, for example, thermoplastics and certain low-melting point metals, such as aluminum and zinc. As explained herein, gradient density spheres may be either solid or hollow.

Prior to casting, a release coating may be applied to the inner surfaces of mold 140 to assist in removal of the product article after the completion of casting, and to increase the life of the mold, as described above.

Prior to application of a mold release coating, a mold pre-treatment process as described above may be employed to clean the mold.

Once ready for casting, two or more of the desired casting materials may be introduced to sealed mold 140 through the valve systems. The casting materials may be injected in liquid form or poured into the molds as a pulverized solid, to be melted down once inside the molds. If solid material is melted in the molds, care should be taken to anticipate any possible expansion of the casting material upon liquefaction, the extent of which will vary depending on the casting material. Where molten liquids are injected into the molds, it will be advantageous to pre-heat the molds to the desired temperature so that the molten casting material does not immediately cool and harden upon injection. It will be appreciated that the molds should be heated to the melting point of the casting material having the highest melting point.

For liquid injection, it will be advantageous to position mold 140 with valve system 111a pointing up and valve system 111d facing down. Then, liquid casting material may be injected through valve 111d, causing liquid casting material to collect under gravity toward the bottom of the mold while valve 111a is left open to exhaust displaced gases.

If it is desired to cast a substantially solid sphere, mold 140 should be completely filled with casting material. Upon the complete filling of mold 140, valve 80 should be screwed down and sealed. Spillover of casting material into hollow core 84 of valve 80 in valve system 111a may occur, but valve 80 may be later cleaned or discarded after the casting process is complete. Alternatively, a pressure release valve system such as valve system 390 in FIG. 9 may be employed to control exhaust and casting material overflow, especially where the casting material must be heated and has a high degree of thermal expansion.

Mold 140 may also be filled by pouring solid pulverized casting material through valve system 111a while valve system 111d is sealed. To aid in pouring of solid pulverized casting material, valve 80 may be temporarily removed to widen the opening in valve system 111a. The mold 140 should be heated to melt the pulverized solid casting material. Additional solid casting material may be poured into the mold, melting as it contacts the molten mixture. This filling process should continue until the mold is filled to the desired degree.

Alternatively, if only one valve is provided at the top of mold 140, casting material may be introduced into the mold 140 through the valve, and then gas may be removed from the hollow interior through the same valve, which then is sealed shut. According to a different method, a single valve may be first used to evacuate the mold 140 of gas, and then employed to inject casting material while maintaining a proper seal on the valve to prevent the re-introduction of gases prior to final closure of the valve. If only one valve is used, a counterbalancing weight should be attached to mold 140 to maintain the rotational balance of the mold.

Once the casting materials have been introduced into the mold, and before casting begins, the casting materials may be de-gassed as previously described herein.

Once all molds within machine 200 have been filled and sealed according to the methods just described, machine 200 may be placed within drum 600 as shown in FIG. 8. Machine 200 is then rotated about the X and Y axes as previously described herein. It is anticipated that for purposes of most casting jobs, the best results will be derived from matching the rotations speeds about all axes of rotation.

The simultaneous rotation of the molds about two axes will induce centrifugal forces that will push denser casting material toward the walls of the mold while lighter casting material is collected closer to the center. If subjected to sufficient centrifugal force over sufficient time, the casting materials will separate, forming distinct layers. The time required to cause this separation will depend on the centrifugal force applied and the physical properties of the casting materials. The greater the centrifugal forces, the faster the separation.

If desired, centrifugal casting may be stopped when the casting materials have only partially separated, resulting in a gradient density sphere with melded or less distinct layers. The specific rotation speeds and casting times will vary depending on the materials used, the desired end product, and the time allotted for casting.

The amount of time it will take to achieve the desired centrifugal separation of casting materials in the mold will depend on a variety of factors, including the rotation speed of the molds, the quantity of casting materials, the miscibility of the casting materials, and other physical and chemical properties of the casting materials at the casting temperature. To reduce casting time, rotation speeds ranging from hundreds to thousands of rotations per minute (rpm) may be employed. One skilled in the art will be able to determine with minimal experimentation what rotation speed and length of casting time is best suited for a particular application. It is anticipated, however, that centrifugal forces of 10 to 200 times the force of gravity (i.e., 10 G-200 G) will be sufficient for most applications.

Equation 1 (previously disclosed herein) provides a formula for deriving centrifugal acceleration as a function of distance from the center of the mold and rotation rate. When casting solid or thick-walled gradient density spheres, the user should ensure that the rotation rate is sufficient to induce any desired centrifugal separation of casting materials near the center of the mold.

In the case of molten casting materials, once the casting materials have been centrifugally separated to the desired degree, the mold should be cooled until all of the casting materials have hardened. Cooling should occur while the molds are still spinning so that centrifugal force is maintained to separate the casting materials. The casting process should be timed such that desired centrifugal separation of the casting materials occurs just prior to hardening. If the casting materials are metals, a slow cooling rate will permit the growth of larger crystals, which will affect the properties of the resultant solidified metals.

Once the cast spheres have completely hardened, machine 200 may be opened and the spheres removed. A machine grip with a friction or suction contact may be required to gently separate the two hemispheres and extract the cast sphere. Further polishing or milling may be applied to smooth the surfaces of the resultant spheres, if desired.

If it is desired to cast a hollow sphere having walls with gradient density (i.e., increasing density from its inner surface to its outer surface) the above described methods may be utilized, except that the mold should be only partially filled before final casting rather than fully filled. The degree of filling will correspond to the size of the hollow space desired in the end product, and allowances should be made for solidification shrinkage of molten casting materials. If the amount of casting material for the hollow sphere is sufficiently small, it may be added to an open hemisphere of the mold prior to casting, rather than injected through the valve system.

It should be noted that when attempting to cast a solid gradient density sphere, formation of a completely solid sphere may be impossible if there is a small amount of trapped gas remaining, and/or if the casting materials shrink relative to the mold or relative to each other upon solidifying and cooling. As a molten material solidifies, it may undergo solidification shrinkage as its volume decreases from its liquid state to its solid state. The shrinkage properties of any given casting material should thus be considered prior to casting.

Applying centrifugal force during the solidification phase will drive the casting materials towards the walls of the mold, while any trapped gas or solidification shrinkage void will manifest as a small void at the center of the casting. As described herein, employing a degassing method will minimize the presence of trapped gases.

If the casting materials remain fairly plastic during solidification, it may be advantageous to construct the mold of a material which may be cooled such that the mold thermally contracts during solidification of the casting, thereby shrinking the diameter of the casting and minimizing the size of any solidification void at the casting's center.

The casting will also undergo a separate thermal contraction after solidification. As previously explained, the mold should not thermally contract more than the final cooled casting so that that the mold does not damage the casting or make it difficult to release.

The thermal expansion properties and chemical compatibility of casting materials should also be considered prior to molding. For example, certain casting material mixtures might tend to react chemically in an undesirable way when heated to casting temperature. As a further example, if the materials forming the inner layers of the sphere have a higher coefficient of thermal expansion than the outer layers, they might tend to cause the outer layers to crack when the sphere is subjected to heat. Ideally, the inner layers should have the same or lower thermal expansion coefficient as the outer layers. The aforementioned chemical and physical properties of various casting materials mixtures are well known in the art, and may readily be investigated prior to casting.

The miscibility of the casting materials also should be considered. Many polymers tend to be immiscible in liquid form and will readily separate when subjected to centrifugal force, as described, for example in U.S. Pat. No. 5,385,950. Though certain metal combinations are immiscible in both their liquid and solid phases, many metals will form alloys when their molten phases are mixed. Centrifugal separation of alloys may be accomplished by selecting a hypereutectic alloy whose higher melting point constituent A will nucleate before its lower melting point constituent B. By applying centrifugal force to the alloy at a temperature between its liquidus and solidus points, nucleated particles with a relatively high concentration of constituent A will be segregated from the liquid phase according to density. Upon cooling below the solidus, the remaining liquid phase will solidify as an alloy containing a relatively high concentration of constituent B. Such centrifugal alloy separation techniques are known in the art and disclosed, for example, in U.S. Pat. Nos. 6,695,936 and 5,303,682. Depending on the properties of the materials used, extended exposure to high centrifugal forces may be required to cause density separation of nucleated hypereutectic alloys.

Centrifugal casting of gradient density spheres may also be accomplished by introducing solid particles of a casting material C into a molten casting material D within the mold, where casting material C has a higher melting point than casting material D. Application of centrifugal force will cause the solid particles of material C to segregate from the liquid material D according to density. Once the casting materials are separated, and while maintaining centrifugal force, heat may be applied to the mold to increase the temperature of the mixture above the melting point of material C. This will cause material C to sinter and/or melt and form a contiguous layer. Subsequent cooling under maintained centrifugal force will yield a stratified sphere with denser outer layers. Where material C is denser than material D, material C will form the outer layer. Where material C is less dense than material D, material D will form the outer layer. When selecting an appropriate mold size, care should be taken to anticipate the liquid and solid volumes of the casting materials, giving any necessary allowance for the expansion of solid casting material C if it is intended to liquefy material C within the mold.

High Temperature Casting Machine

An embodiment of the present invention is a high temperature biaxial centrifugal casting machine suitable for molding materials such as steel and glass. The high temperature molds of the high temperature embodiment consist of sealable crucibles having two hemispheres that join to form a hollow spherical interior. The crucibles may be made of a highly refractory material, such as zirconium dioxide or magnesium oxide. The use of sealed crucibles is known in the art, and is disclosed, for example, in U.S. Pat. No. 6,101,212 and Published U.S. patent application Ser. No. 12/175,122. The remainder of the machine is composed of suitably heat-resistant or insulated materials. Ceramic or other high temperature parts may be used throughout the machine for optimal thermal capacity. For example, bearings and gears may be made of ceramic or other high temperature materials. Screws exposed to high temperatures may be coated with molybdenum disulfide (or equivalent substance) to further assure that they may be unscrewed after a heating and cooling cycle.

It will be appreciated that the exact dimensions and proportions of the machine may be varied to suit particular needs. For example, the thickness of the machine's parts may be increased to handle heavier duty casting jobs, or decreased to handle lighter duty casting jobs. The walls of the mold should be thick enough to avoid warping at the casting temperature. Gear ratios may also be adjusted to suit particular applications, and the size of the molds relative to the frame may be modified.

If it is desired to cast a spheroid of a particular diameter from molten casting material, or if it is desired to cast a hollow spheroid of a particular wall thickness from molten casting material, care should be taken to anticipate solidification shrinkage and thermal contraction of the casting material, as well as thermal contraction of the mold. Depending on the casting material used, the casting material may undergo solidification shrinkage as it transitions from a liquid to a solid state. Applying centrifugal force during solidification will keep the casting material in contact with the inner walls of the mold, and the solidification shrinkage will manifest as a thinning of the walls of the sphere upon solidification. The solidification shrinkage properties of any given casting material should be considered prior to casting and any necessary allowances made when selecting an appropriate mold size.

The solidified casting may undergo a separate thermal shrinkage as it cools to ambient temperature. It is known in the art of centrifugal casting of cylinders that it is desirable to employ a mold made of a material that will not contract more than the casting upon final cooling, as excessive contraction of the mold might result in damage to the casting and/or the mold, or might prevent easy release of the casting from the mold. Anticipating and compensating for such thermal contraction effects is generally known in the art of centrifugal casting.

If it is desired to melt metal or glass within the crucible molds, induction furnace coils may be mounted to the frame of the machine. A coreless induction furnace system is provided including hollow copper tubes coiled surrounding the crucible molds, but not contacting them. The copper tubes carry a high wattage alternating current and may have external insulating coatings and support members for holding the coils in the proper mounting position and insulating them from other parts of the machine. Cooling fluid is passed through the hollow induction tubing to prevent overheating.

Alternating current in the induction tubing generates a powerful oscillating magnetic field within the space enclosed by the coils, causing metal (and other conductive materials) within the crucibles to be heated to a desired temperature. The higher the wattage, the faster the temperature increase. For example, a 35 kilowatt induction furnace operating at 460 volts and 60 hertz alternating current can melt 10 kilograms of steel in less than half and hour. Various other voltage and frequency combinations may be chosen to achieve desired results. For example, higher frequency current results in less magnetic field penetration of metal casting material, which is suitable for small casting jobs. Higher frequency current also induces less turbulence in molten casting material, which may be advantageous for centrifugal casting purposes.

Metal may be readily melted within an induction furnace by direct exposure to the induction field while within a refractory crucible. Glass may be melted in an induction furnace crucible by means of an induction-heated metal with a higher melting point than the glass, such as molybdenum. The use of heated metal to melt glass is know in the art and discussed, for example, in U.S. Pat. No. 2,814,657. Additionally, beyond certain temperatures, glass itself may become susceptible to induction currents and may be heated directly by the induction field. In the present invention, a layer of metal with a melting point beyond that of the casting glass may be added as a lining along the inner surface of the crucible mold. When exposed to the induction coils, this metal can be made hot enough to melt the casting material within the mold, while the walls of the mold serve as insulation.

Two induction furnace embodiments are disclosed. In one embodiment, slip ring rotary union joints permit cooling fluid and electricity to be delivered to induction coils within the casting machine while it is rotating. In the second embodiment, induction coils encircle a frame surrounding the rotating casting machine.

Figure 9:
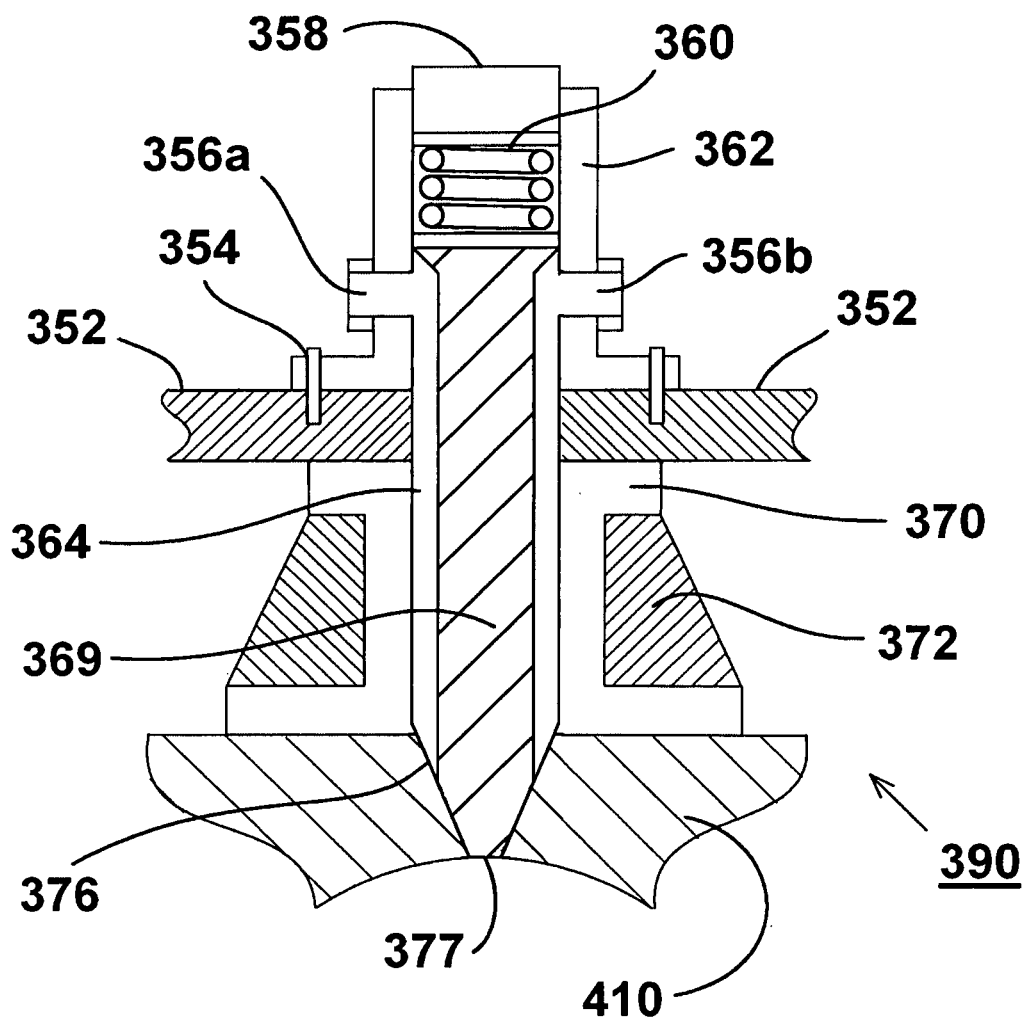
FIG. 9 is a schematic, broken-away, cross-sectional view of a pressure release valve system used in one embodiment of the invention.

FIG. 9 is a cross-sectional view of a valve system 390 sitting atop mold hemisphere 410. A hollow cavity 364 extends down the length of neck portion 370 and communicates with the inner cavity of the mold via hole 376. A plunger 369 may be inserted into cavity 364 to seal hole 376 with the tip 377 flush with the inner wall of mold 410. When plunger 369 is inserted into cavity 364, empty space remains between the plunger 369 and the walls of cavity 364. This empty space serves as an overflow area for molten material filling the mold.

Tapered bearing sleeve 372 encircles thermally insulated neck portion 370. Tapered bearing sleeve 372 may also be made of high temperature ceramic material to improve thermal resistance. A portion of a drive gear 352 is shown attached to the top of neck portion 370. Drive gear 352 is shown in greater detail in FIGS. 10, 11 and 12.

A pressure release system 362 is attached to the top of neck portion 370 by bolts 354. The purpose of pressure release system 362 is to allow gases and/or overly pressurized casting material to escape from the mold while still maintaining a seal on hole 376. Pressure release system 362 employs a spring 360 (or equivalent) to apply a desired amount of force to plunger 369, thereby maintaining a pressurized seal on hole 376. Cap 358 may be screwed down to increase the pressure on plunger 369. Pressurized gas seeking to escape from the mold will push upwards on the bottom 377 of plunger 369 and escape through cavity 364 to vents 356a and 356b. Alternatively, cap 358 may be retracted or removed to lift plunger 369 away from hole 376, thereby allowing fluent material to either be placed within or extracted from the mold through cavity 364.

It should be noted that valve system 390 is just one example of a variety of equivalent valve systems which might be used efficaciously, providing for pressure release and overflow.

Figure 10:
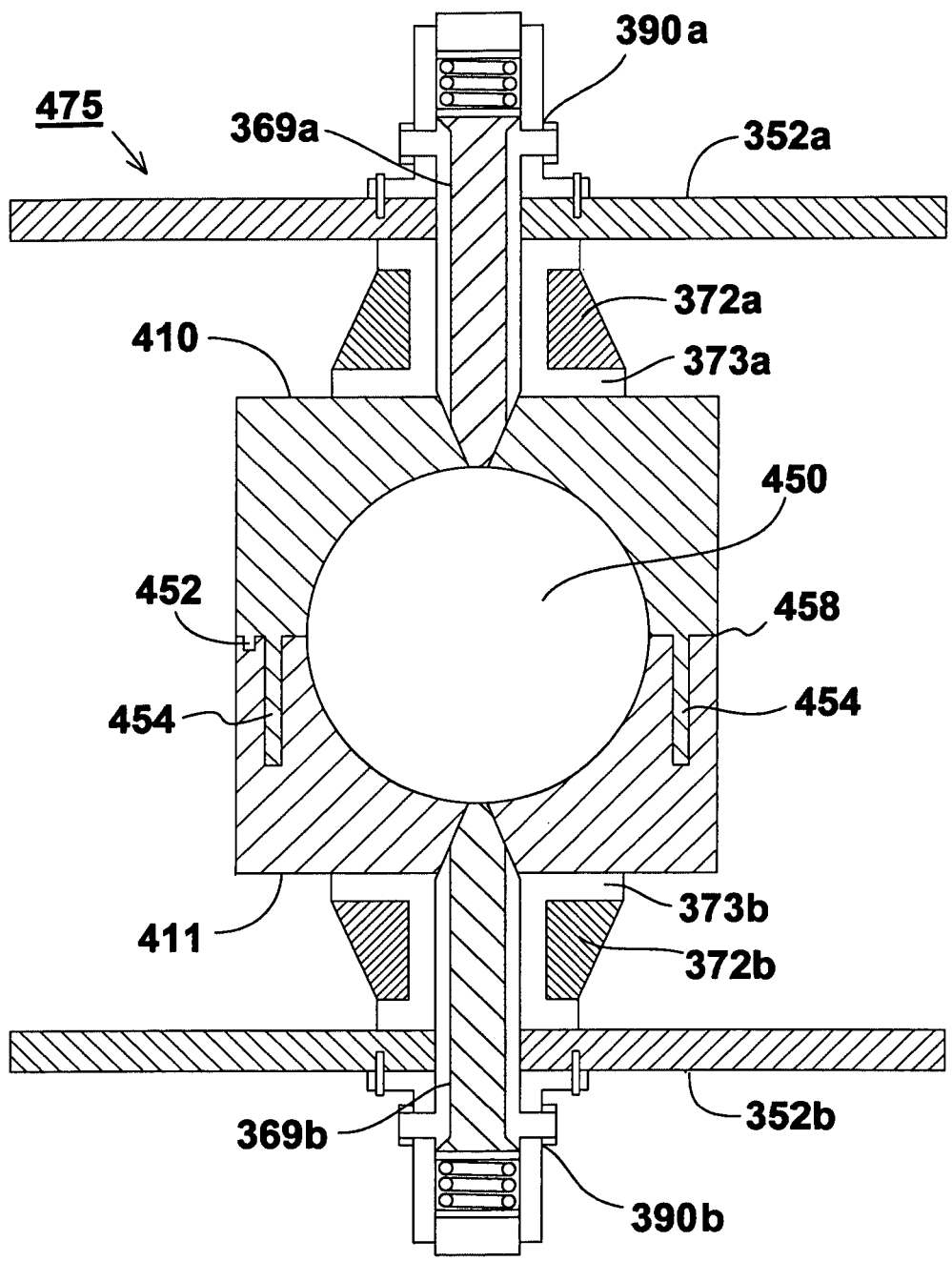
FIG. 10 is a schematic cross-sectional view of a hollow spherical mold used in one embodiment of the invention, together with associated gear and bearing parts.

FIG. 10 is a cross-sectional view of high temperature mold system 475. The exterior shape of mold 475 is that of a cylinder, but mold hemispheres 410 and 411 create a spherical internal mold cavity 450 for casting molten metal or other high temperature material. This shape, as well as one having a spherical exterior, is called a "spherical mold."

Hemispheres 410 and 411 are preferably made of a highly refractory material, such as zirconium dioxide or magnesium oxide. A pressure relief valve 390a is mounted on hemisphere 410, and an identical valve 390b is mounted on hemisphere 411. Drive gears 352a and 352b are shown, and their function will be fully described below. As with all other molds described herein, the inner surface of mold 475 may have certain raised or indented portions, such that the cast sphere will have corresponding surface features, such as dimples, indentations or raised portions.

The rim of hemisphere 410 is fully encircled by an elongated lip 454, which mates with a corresponding groove in the rim of hemisphere 411. One or more locking pins 452 extend from the rim of hemisphere 410 and mate with corresponding holes in the rim of hemisphere 411. The function of these locking pins is to restrict the movement of hemisphere 410 relative to hemisphere 411 so that one hemisphere does not rotate relative to the other. The same function could, of course, be accomplished by a latch bridging the outer surface of hemispheres 410 and 411, or equivalent fixing means. The design of lip 454 and locking pins 452 is such that an adequate seal is formed along seam 458. A high temperature ceramic gasket may be inserted at seam 458 to create an air-tight seal, if desired for a given casting application.

Latching mechanisms may be further provided on the exterior of mold 475, bridging seam 458 and maintaining a tight seal between hemispheres 410 and 411.

Note that valves 390a and 390b are identical and sit on opposing sides of mold 475, thus preserving the dynamic balance of mold 475 during rotation. Counterweights may also be attached to mold 475 to ensure proper rotational balance.

Figure 10A:
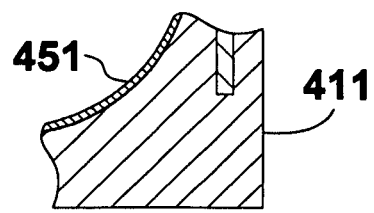
FIG. 10A is a schematic, broken away, cross-sectional view of an embodiment of the mold depicted in FIG. 10.

FIG. 10A is a cross-section, broken-away view of an embodiment of mold 475 wherein an induction-heatable layer 451 is provided on the inner surface of the mold. This lining may be made of high-melting point material such as molybdenum, which may be inductively heated to cause lower melting-point casting materials within the mold to melt, as previously described herein. It is preferable that layer 451 cover the entire inner surface of mold 475 to as to provide even heating and surface contour for the casting material, however the invention will operate where the layer 451 covers only a portion of the inner surface of mold 475.

Figure 11:
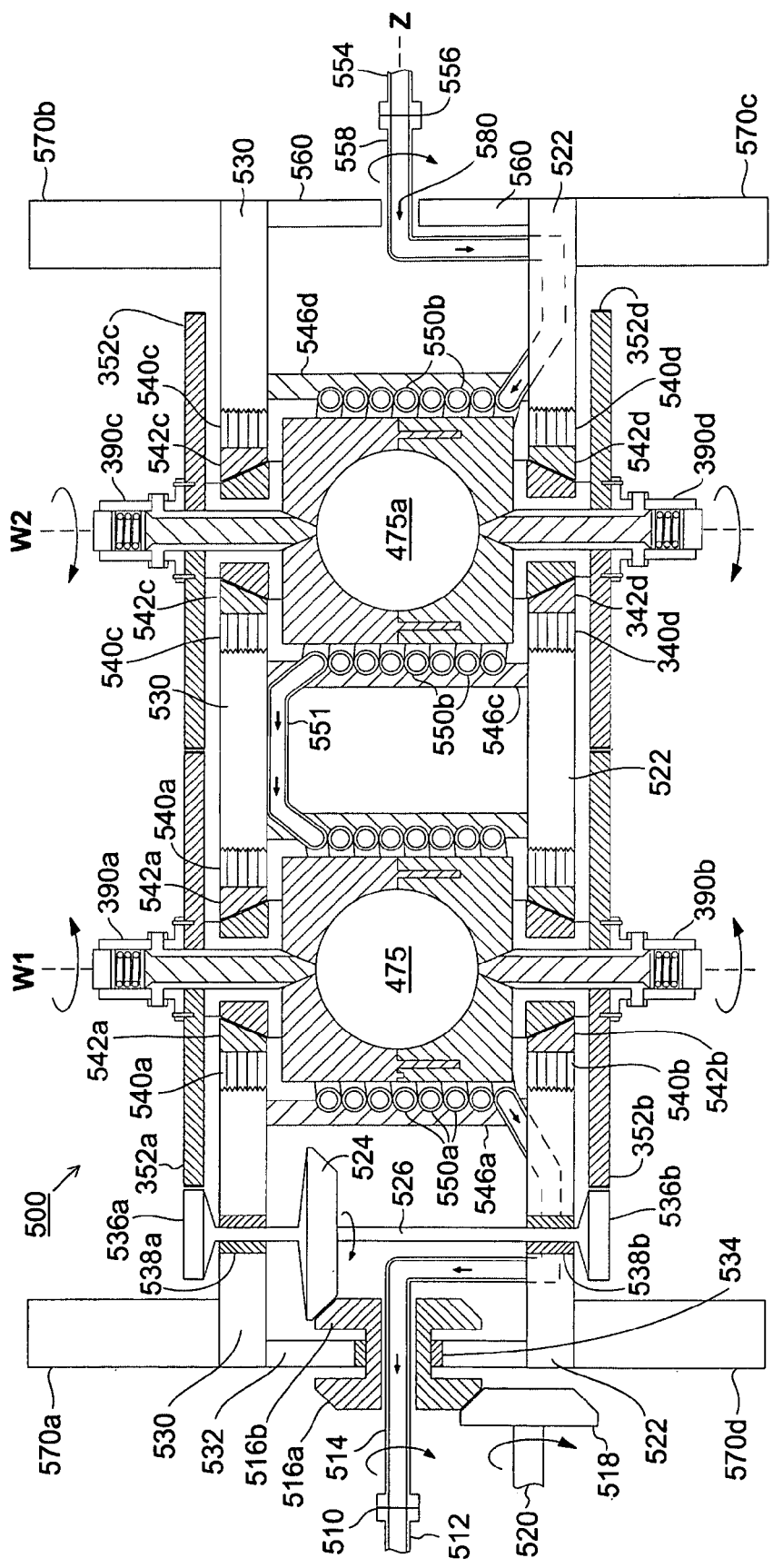
FIG. 11 is a schematic cross-sectional view of another embodiment of the invention.

FIG. 11 is a cross-sectional view of a 2-mold embodiment of a biaxial centrifugal casting machine 500. First and second hollow spherical molds 475 and 475a are secured between upper wall 530 and lower wall 522. As previously explained, each mold may be separated into two halves to permit extraction of a finished product from the mold. At the upper half of mold 475, tapered bearing sleeve 372a engages tapered bearing mount 542a within a circular mounting ring 540a. Mounting ring 540a is a substantially solid plate that may be screwed into upper wall 530. Similarly, at the lower half of the mold, a tapered bearing sleeve 372b engages tapered bearing mount 542b within circular mounting ring 540b. Mounting ring 540b may be screwed into lower wall 522.

It will be appreciated that by screwing mounting ring 540a into upper wall 530 while mounting ring 540b is screwed into lower wall 522, the hemispheres of the molds 475 and 475a will be joined and sealed together. Mounting rings 540a and 540b may be locked in place by a suitable latching system or the equivalent. When it is desired to separate the hemispheres of the molds, mounting rings 540a and 540b may be unscrewed from machine 500. Bearing mounts 542a and 542b permit the molds to rotate about the axes W1 and W2, while also accepting an axial load from the molds.

The mounting of the second mold 475a is like that of mold 475 and will not be described further. Side walls 532 and 560 bridge walls 530 and 522 to provide structural stability to machine 500.

A bevel gear 516 having two heads 516a and 516b is mounted to bearing 534 in side wall 532. Gear 516 has a hollow center that allows passage of induction tube 514 and permits induction tube 514 to spin independently of gear 516. A motor shaft 520 with bevel gear 518 is provided to spin gear 516 without affecting the spin of induction tube 514. Gear head 516b meshes with another bevel gear 524, which is mounted between upper wall 530 and lower wall 522 on an axle 526. Axle 526 is permitted to spin by bearings 538a and 538b. Additional support structures (not shown) may be provided to support axle 526.

Gears 536a and 536b are mounted to the ends of axle 524 outside of machine 500. It will be appreciated that gear 524 may orbit gear head 516b while machine 500 spins about axis Z, which is an arrangement similar to that of a standard automotive differential gear system. It will improve the efficiency of operation of the drive motor connected to drive shaft 520 if shaft 520 is caused to rotate in a direction that causes gear 516 to rotate in the opposite direction about the Z axis as machine 500.

Gears 536a and 536b engage drive gears 352a and 352b, respectively, of mold 475. The spinning of gears 536a and 536b thereby cause mold 475 to spin about axis W1. At the same time, drive gears 352a and 352b engage corresponding drive gears 352c and 352d of mold 475a, causing mold 475a to spin about axis W2 at the same rate as mold 475 spins about axis W1. It will thus be appreciated that drive motor shaft 520 is capable of causing molds 475 and 475a to spin about axes W1 and W2, respectively, at the same speed within machine 500.

The size of gears 516, 524, 536a and 536b may be varied such that gear 516 need not rotate as rapidly to cause molds 475 and 475a to spin at the desired rotational speed about axes W1 and W2. For example, if the size of gears 536a and 536b is increased relative to the size of gears 352a and 352b, it will require fewer rotations of axle 526 to cause the desired rate of rotation of molds 475 and 475a about axes W1 and W2. Enlarging gears 536a and 536b may also improve the power and performance of the system, especially when there are multiple molds within machine 500.

An induction furnace system may be disposed within machine 500 to permit the contactless heating of metal or glass within molds 475 and 475a. It is a novel feature of the present invention that the induction furnace system is connected to an external power and cooling fluid source by rotary slip fittings which permit the induction furnace system to operate while machine 500 is spinning about axis Z. The induction furnace system consists of a hollow copper tube that may be attached by insulating fittings to the frame of machine 500 and coiled around the outer cylindrical surfaces of molds 475 and 475a. Importantly, the induction coils do not contact molds 475 and 475a, permitting the molds to spin freely about axes W1 and W2.

High frequency alternating current is supplied by copper tubing 554. Cooling fluid 580 (such as water) is simultaneously pumped through the core of tubing 554. A rotary slip fitting 556 permits electrical current and cooling fluid to pass from tube 554 to tube 558 while tube 558 is spinning about axis Z. Rotary unions that permit high voltage AC current to be simultaneously transmitted with pressurized fluid are known in the art and may be custom built to service specific design requirements.

It will be understood that slip rings may be employed to transport electricity or fluid to the casting machine for any purpose, including, for example, transporting cooling water to the molds. In one embodiment, tubes transporting cooling water may be disposed within machine 500 and permit controlled quantities of cooling water to contact the surface of the mold(s) to assist in cooling. In another embodiment, electricity may be run through machine 500 to power electronic devices disposed within machine 500, such as gauges, thermocouples, or any other powered device that might improve the function of the machine.

Tube 558 runs inside machine 500 through a hole in the center of side wall 560. Tube 558 may be mounted to the frame of machine 500 by insulating attachments. Tube 558 is coiled around mold 475a to create induction furnace coil 550b. The effect of running high frequency AC current through coil 550b is to create a powerful oscillating magnetic field at the center of mold 475a which is capable of melting metal. As noted, coil 550b does not contact the surface of mold 475a, permitting mold 475a to spin freely about axis W2.

Tube 551 leaves coil 550b and transports electricity and cooling water to induction furnace coil 550a around the cylindrical exterior of mold 475 without touching the surface of the mold. Mold 475 may therefore spin freely about axis W1 while the induction furnace is in operation without touching coil 550a.

In the configuration shown in FIG. 11, the magnetic field generated by coil 550a will point in the same direction as the field created by 550b, such that each magnetic field compliments the other, though it is believed that the induction coils would also function properly if they were wound in opposing directions.

Tube 514 leaves coil 550a, and runs out of machine 500 through the center of gear 516. A bearing mount with electrical insulation (not show) may be disposed within the hollow center of gear 516 to permit tube 514 to spin freely in gear 516 without transmitting current to gear 516. Tube 514 is connected to external tube 512 by rotary union 510, allowing tube 514 to spin freely about axis Z while tube 512 is stationary. Tube ends 512 and 554 are connected to an external power supply and cooling fluid supply.

In an alternative mode of operation, the rotary unions 510 and 556 may be replaced with simple connector joints that may be decoupled after heating and just before centrifugal casting. Prior to such decoupling, the induction coils should either be pumped free of cooling fluid, or the ends of the coils sealed at the openings with the connector joints. This embodiment may be used where heating of the casting material during centrifugal rotation is not required.

Mounting struts 570a, 570b, 570c and 570d (as well as additional mounting struts not shown in the figure) permit machine 500 to be mounted to an external rotating structure such as drum 600 shown in FIG. 8. Once machine 500 is mounted within drum 600 (or equivalent external structure, such as, for example, rollers), the struts may be firmly secured by screws, latches, or other fixing means.

The external structure is capable of spinning machine 500 rapidly about axis Z. Fast rotation about axis Z induces a centrifugal force within molds 475 and 475a directed outward from axis Z.

As explained above, while machine 500 is rotating about axis Z, motor shaft 520 causes molds 475 and 475a to rotate about axes W1 and W2, respectively. The rotation speed of shaft 520 relative to machine 500 may be adjusted so that the rotation speeds of the molds about axes Z, W1 and W2 are matched, resulting in even distribution of centrifugal forces. The rotation speed of shaft 520 relative to machine 500 may also be adjusted so that the rotation speeds about axes W1 and W2 are different from the rotation speed about axis Z, such as, for example, when it is desired to mix the contents of the molds prior to final casting.

The magnetic fields generated by an induction furnace may cause stirring of the casting material within the molds. The force of this magnetic stirring may be overcome by the centrifugal forces within the molds, or the magnetic field may simply be turned off after the casting materials have been fully melted and centrifugal casting is sufficiently underway.

Figure 12:
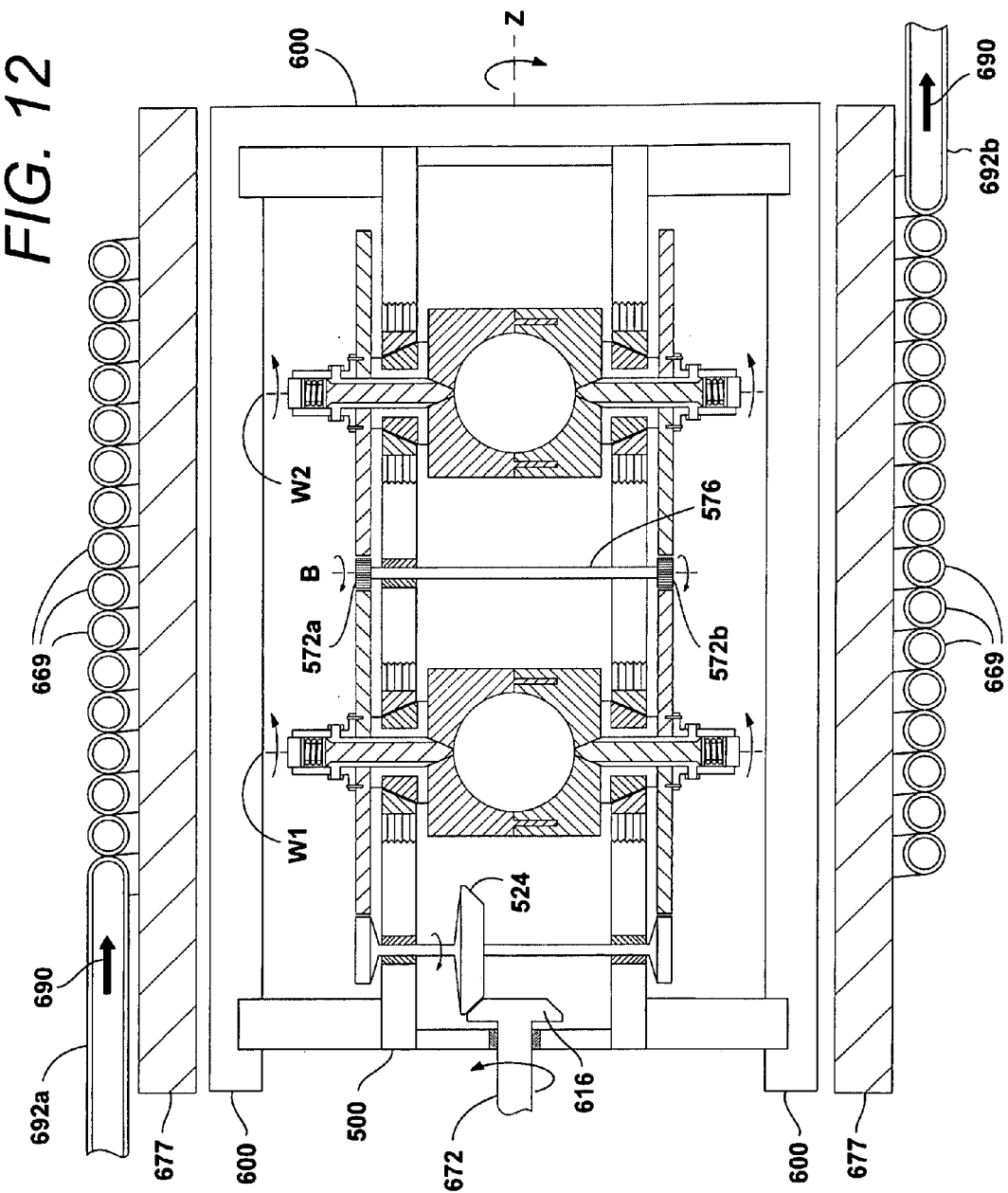
FIG. 12 is a schematic cross-sectional view of a further embodiment of the invention.

In an alternative embodiment shown in FIG. 12, induction tubes and coils may be entirely removed from machine 500 and a larger set of induction furnace coils 669 provided around stationary frame 677 around drum 600. FIG. 12 shows machine 500 inserted into rotatable drum 600. A drive shaft 672 with gear head 616 engages gear 524 within machine 500. In a manner previously explained, drive shaft 672 is mounted by a bearing and may spin independently of machine 500. The rotation of gear 616 induces the rotation of gear 524, which ultimately results in the rotation of molds 475 and 475a about axes W1 and W2. Drum 600 is caused to rotate about axis Z by a motor and drive system (not shown) resulting in rotation of molds 475 and 475a about axis Z.

FIG. 12 also exhibits an optional alternative drive gear configuration in which gears 352a and 352b engage intermediary gears 572a and 572b, respectively, which are mounted to axle 576. Axle 576 is mounted between upper wall 530 and lower wall 522, as is permitted to spin about axis B by bearings. The spinning of gears 572a and 572b cause drive gears 352c and 352d, respectively, of mold 475a to spin. Mold 475a is thereby caused to spin about axis W2 in the same direction and at the same speed as mold 475 spins about axis W1. The operator may find that causing the molds to spin in the same direction in this manner may offer certain stabilizing benefits. It will be appreciated that any of a variety of gear configurations may be employed by one of skill in the art to achieve desired spin properties of the molds.

Stationary cylindrical wall 677 surrounds drum 600. Induction furnace coils 669 encircle wall 677. Cooling fluid 690 enters induction tube 692a, circulates through coils 669, and exits through tube 692b. A high frequency electric current carried through the induction coils generates an oscillating magnetic field within the molds. Sufficient kilowatts are supplied to melt the chosen casting materials. To prevent magnetic interference or heating of other parts of machine 500, the components of machine 500 may be constructed of ceramic materials that will not be adversely affected by the induction field.

A dynamic balancing mechanism and/or counterweights may be attached to the frame of machine 500 or any structure mounting machine 500 to minimize unwanted gyration or vibration of machine 500 during operation.

It will be appreciated that although a 2-mold embodiment has been described by the foregoing Figures and description, the design of the present invention can be easily modified to accommodate a single mold, or a long chain of multiple molds.

Casting of Hollow Spheres with High Temperature Machine

According to an inventive casting method disclosed herein, machine 500 may be employed to cast hollow spheres containing low air pressure or a vacuum. Casting material for this purpose might consist of heated liquid casting material, ambient temperature self-hardening liquid material, or ambient temperature solid material to be melted while within the mold. However, machine 500 is specially designed to handle high-melting point metals and glass, possessing highly refractory molds and having the ability to accommodate induction coils.

Prior to casting, a coating may be applied to the inner surfaces of mold 475 to assist in removal of the product article after the completion of casting, and to increase the life of the mold. For relatively low temperature applications, various forms of grease, lubricant or low friction polymer may serve the purpose. For high temperature metal casting applications, a high temperature coating may be applied, such as graphite, bentonite or zircon. Coatings such as graphite will provide a smoother coating, while coatings such as bentonite will provide a friction coating that will allow the inner surface of the mold to grip the casting material during centrifugal acceleration. Numerous coating materials are known in the art of centrifugal casting and may be selected to serve a particular application.

Prior to application of a mold coating, a mold pretreatment process may be employed to clean the mold of any debris or unwanted material from a previous casting job. Pre-treatment may involve heating the mold, treating its inner surfaces with a mild etchant, and then washing it out with fresh water. Once dried and wiped, the mold may then be coated with a coating material as previously described.

Casting material may be placed within mold by separating mold 475 into hemispheres 410 and 411 so that casting material (solid or liquid) may be placed within the mold. Hemispheres 410 and 411 may be separated by unfastening walls 540a or 540b and pulling one or both of hemispheres 410 and 411 away from machine 500. Casting material may then be added. After hemispheres 410 and 411 are re-attached and sealed, mold 475 may be evacuated of unwanted gases by a vacuum pump attached to evacuation ports 356a and 356b on valve system 390 as shown in FIG. 9. Temporary loosening or removal of the pressure release system 360 will facilitate evacuation, or other valves described elsewhere herein can be used for evacuation.

Rather than separating hemispheres 410 and 411 to insert casting material, liquid casting material may be injected into mold 475 through valve systems 390a and/or 390b while mold 475 is sealed. For example, an evacuator attached to ports 356a and 356b on valve system 390a may remove air from within mold 475 while an injector coupled to valve system 390b injects liquid or casting material into the mold. Plunger 369 may be temporarily retracted to permit injection through the valve. The timing of the evacuation and injection may be such that casting material is only injected after mold 475 has been adequately evacuated of gases.

Alternatively, if only one valve is provided at the top of mold 475, casting material may be introduced into the mold 475 through the valve, and then gas may be removed from the hollow interior through the same valve, which then is sealed shut. According to a different method, a single valve may be first used to evacuate the mold 475 of gas, and then employed to inject casting material while maintaining a proper seal on the valve to prevent the re-introduction of gases prior to final closure of the valve. If only one valve is used, a counterbalancing weight should be attached to mold 475 to maintain the rotational balance of the mold.

Once the casting materials have been introduced into the mold, and before casting begins, sufficient exhaust time should be allowed to permit any unwanted gases to escape from the casting materials. Heating the casting materials and/or exposing them to a vacuum for an extended period of time may promote degassing and reduce later unwanted outgassing of the casting materials. Negative pressure may be applied to the casting materials by provision of a vacuum pump attached to the valve system while the mold is sealed. Degassed gases may also be evacuated through the valve system. Vacuum degassing is often used, for example, to remove dissolved hydrogen gas from steel. For certain casting materials, chemical degassers may alternatively or additionally be added to bond with free gas particles and thereby remove gas from the casting material. Certain molten metals react adversely with oxygen, so casting under vacuum conditions or in the presence of an inert gas may be advantageous when working with such metals.

Alternatively, to absorb gases outgassed from the casting materials, the mold may be evacuated by use of one of the valves described herein before rotation starts. If gas later accumulates during centrifugal motion, such gases will gather in the hollow center of the body being molded and fill the void. Thus, the unwanted gases fill the cast sphere instead of being vented.

It may improve the overall efficiency of the casting process to melt the casting materials prior to placing them within the molds, and then apply heat to the molds initially as a means to maintain the temperature of the casting materials above their melting point, and then as a means to control the cooling rate of the casting materials while centrifugal forces are applied.

Once molds 475 and 475a are sealed, metal or glass casting material inside them may be melted down and/or maintained above their melting point by means of the induction furnace coil systems described previously. An external alternating current power supply and cooling fluid circulator are provided to supply the induction coils with electricity and cooling fluid. As previously described, degassing may be performed at this stage just prior to casting.

As is evident, the procedures just described for charging mold 475 with casting material also apply to the rest of the molds in machine 500.

After the casting material has been melted, machine 500 is caused to spin about axis Z by drum 600 (or similar turning device). Drive gear 516 is simultaneous rotated to induce rotation of the molds about axes W1 and W2.

In a preferred embodiment, the rotation speed of the molds about axes W1 and W2 are substantially matched to the rotation speed of the molds about axis Z. The relative speed of the molds about axes W1 and W2 as compared to axis Z may also be varied during the early stages of casting to promote even spreading of the liquid casting material within the molds. For certain casting jobs, the user may find that the casting materials may be adequately spread about the inner surface of the mold by oscillating the rotation speed about one axis relative to the other. The objective, of course, is to spread the casting material evenly about the inner surface of the mold.

The amount of time it will take to evenly spread casting material in the molds will depend on a variety of factors, including the rotation speed of the molds, the quantity of casting material, and the physical properties of the casting material at the casting temperature. To reduce casting time, rotation speeds ranging from hundreds to thousands of rotations per minute (rpm) may be employed. One skilled in the art will be able to determine with minimal experimentation what rotation speed and length of casting time is best suited for a particular application. It is anticipated, however, that centrifugal forces of 10 to 200 times the force of gravity (i.e., 10 G-200 G) will be sufficient for most applications.

Equation 1 (previously disclosed herein) provides a formula for deriving centrifugal acceleration as a function of distance from the center of the mold and rotation rate. When casting hollow spheres, the relevant centripetal acceleration is that near the surface of the hollow spherical interior of the mold.

Once the casting material has been evenly spread inside the molds, heating should be stopped while the molds are still spinning. Cooling may be accomplished by either allowing the molds to cool slowly under ambient temperature conditions, or by quenching the molds with controlled quantities of water, or other cooling liquid or gas. The cooling rate may affect the mechanical properties of the resulting sphere. In the case of metal casting material, slower cooling rates will permit the growth of larger crystals, which tends to improve the strength of the solidified metal. For example, U.S. Pat. No. 1,844,701 teaches that gradual cooling of an induction furnace-heated centrifugal casting machine will improve the durability of cast metal.

Once the casting material has sufficiently hardened, the rotation of the molds may be stopped. Once machine 500 has stopped spinning, it may be removed from drum 600 so that the mold hemispheres may be separated and the hollow vacuum spheres formed therein removed. A machine grip with a friction or suction contact may be required to gently separate the two hemispheres and extract the cast sphere.

Casting of Gradient Density Spheres with High Temperature Machine

According to an inventive casting method disclosed herein, machine 500 is employed to cast gradient density spheres made from self-hardening materials, or materials with high melting points, including glass and metals such as steel. Such gradient density spheres are denser near their surface and less dense towards their core.

First, the molds are prepared for casting in the same way as described above.

Once ready for casting, two or more of the desired casting materials are introduced to sealed mold 475 through the valve systems. The casting materials may be injected in liquid form or poured into the molds as a pulverized solid, to be melted down once inside the molds. Where molten liquids are injected into the molds, it will be advantageous to pre-heat the molds to the desired temperature so that the molten casting material does not immediately cool and harden upon injection.

For liquid injection, it will be advantageous to position mold 475 with valve system 390*a* pointing up and valve system 390*b* facing down. Then, liquid casting material may be injected through valve 390*b*, causing liquid casting material to collect under gravity toward the bottom of the mold while valve 390*a* is left open to exhaust displaced gases. The pressure release system of valve 390*a* should be loosened to permit gas exhaust, while the plunger 369 of valve 390*b* should be retracted to permit injection of casting material.

If only one valve is provided at the top of mold 475, casting material may be introduced into the mold 475 through the valve, and then gas may be removed from the hollow interior through the same valve, which then is sealed shut. According to a different method, a single valve may be first used to evacuate the mold 475 of gas, and then employed to inject casting material while maintaining a proper seal on the valve to prevent the re-introduction of gases prior to final closure of the valve. If only one valve is used, a counterbalancing weight should be attached to mold 475 to maintain the rotational balance of the mold.

Once the casting materials have been introduced into the mold, and before casting begins, the casting materials may be de-gassed as previously described herein.

As is evident, the procedures just described for charging mold 475 with casting material also apply to the rest of the molds in machine 500. It may improve the overall efficiency of the casting process to melt the casting materials prior to placing them within the molds, and then apply heat to the molds initially as a means to maintain the temperature of the casting materials above their melting point, and then as a means to control the cooling rate of the casting materials while centrifugal forces are applied.

Mold 475 may alternatively be filled by pouring solid pulverized casting material through valve system 390*a* while valve system 390*b* is sealed. To aid in pouring of solid pulverized casting material, plunger 369 and cap 358 may be temporarily removed to widen the opening in valve system 390*a*. Mold 475 should be heated to melt the pulverized solid casting material. Additional solid casting material may be poured into the mold, melting as it contacts the molten mixture. If it is desired to cast a substantially solid sphere, this filling process should continue until the mold is completely filled. As explained above, sufficient exhaust time should be allowed to permit any unwanted gases to escape from the liquid mixture, and drawing a vacuum through valve 390*a* may speed the exhaust process. Alternatively or additionally, a chemical degasser may be added to the casting material to bond with free gas particles.

Upon filling of mold 475, the pressure release valve systems of valves 390*a* and 390*b* should once again be tightened to seal mold 475. Spillover of casting material into hollow cavities 364 of valve systems 390*a* and 390*b* may occur, but valves 390*a* and 390*b* may be later cleaned or discarded after the casting process is complete. If pressure builds from lingering exhaust gases during the molding process, or from expansion of the casting materials, such pressure or material will be released into cavities 364 of pressure release valve systems 390*a* and 390*b*.

Once all molds within machine 500 have been filled and sealed according to the methods just described, machine 500 should be placed within drum 600 (or similar rotating mount structure) and gear shaft 520 should be engaged to a motor. Machine 500 is then spun about axis Z by drum 600 and molds 475 and 475*a* are caused to spin about axes W1 and W2 by the motor spinning shaft 520. The rotation rates about the W and Z axes may be substantially matched as previously described herein.

The simultaneous rotation of the molds about two axes will induce centrifugal forces that will push denser casting material toward the walls of the mold while lighter casting material is collected closer to the center. If subjected to sufficient centrifugal force over sufficient time, the casting materials will separate, forming distinct layers. The time required to cause this separation will depend on the centrifugal force applied and the physical properties of the casting materials. The greater the centrifugal forces, the faster the separation.

If desired, centrifugal casting may be stopped when the casting materials have only partially separated, resulting in a gradient density sphere with less distinct layers. The specific rotation speeds and casting times will vary depending on the materials used and the desired end product.

The amount of time it will take to achieve the desired centrifugal separation of casting materials in the mold will depend on a variety of factors, including the rotation speed of the molds, the quantity of casting materials, the miscibility of the casting materials, and other physical and chemical properties of the casting materials at the casting temperature. To reduce casting time, rotation speeds ranging from hundreds to thousands of rotations per minute (rpm) may be employed. One skilled in the art will be able to determine with minimal experimentation what rotation speed and length of casting time is best suited for a particular application. It is anticipated, however, that centrifugal forces of 10 to 200 times the force of gravity (i.e., 10 G-200 G) will be sufficient for most applications.

Equation 1 (previously disclosed herein) provides a formula for deriving centrifugal acceleration as a function of distance from the center of the mold and rotation rate. When casting solid or thick-walled gradient density spheres, the user should ensure that the rotation rate is sufficient to induce any desired centrifugal separation of casting materials near the center of the mold.

Once molten casting materials have been centrifugally separated to the desired degree, the mold should be cooled until all of the casting materials have hardened. Cooling should occur while the molds are still spinning so that centrifugal force is maintained to separate the casting materials. The casting process should be timed such that desired centrifugal separation of the casting materials occurs just prior to hardening. In the case of metal casting material, a gradual decrease in heating temperatures will permit the growth of larger crystals, which will affect the properties of the resultant solidified metal. For example, U.S. Pat. No. 1,844,701 teaches that gradual cooling of an induction furnace-heated centrifugal casting machine will improve the durability of cast metal.

Once the cast spheres have completely hardened, machine 500 may be opened and the spheres removed. A machine grip with a friction or suction contact may be required to gently separate the two hemispheres and extract the cast sphere. Further polishing or milling may be applied to smooth the surfaces of the resultant spheres.

If it is desired to cast a hollow sphere having walls with gradient density (i.e., increasing density from its inner surface to its outer surface) the above-described methods may be utilized, except that the mold should be only partially filled before final casting rather than fully filled. The degree of filling will correspond to the size of the hollow space desired in the end product, and allowances should be made for solidification shrinkage of molten casting materials. If the amount of casting material for the hollow sphere is sufficiently small, it may be added to an open hemisphere of the mold prior to casting, rather than injected through the valve system.

It should be noted that when attempting to cast a solid gradient density sphere, formation of a completely solid sphere may be impossible if there is a small amount of trapped gas remaining, and/or if the casting materials shrink relative to the mold or relative to each other upon solidifying and cooling. As a molten material solidifies, it may undergo solidification shrinkage as its volume decreases from its liquid state to its solid state. The shrinkage properties of any given casting material should thus be considered prior to casting.

Applying centrifugal force during the solidification phase will drive the casting materials towards the walls of the mold, while any trapped gas or solidification shrinkage will manifest as a small void at the center of the casting. As described herein, employing a degassing method will minimize the presence of trapped gases. If the casting materials remain fairly plastic during solidification, it may be advantageous to construct the mold of a material which may be cooled such that the mold thermally contracts during solidification of the casting, thereby shrinking the diameter of the casting and minimizing the size of any solidification void at the casting's center.

The casting will also undergo a separate thermal contraction after solidification. As previously explained, the mold should not thermally contract more than the final cooled casting so that that the mold does not damage the casting or make it difficult to release.

The thermal expansion properties and chemical compatibility of casting materials should also be considered prior to molding. For example, certain casting material mixtures might tend to react chemically in an undesirable way when heated to casting temperature. As a further example, if the materials forming the inner layers of the sphere have a higher coefficient of thermal expansion than the outer layers, they might tend to cause the outer layers to crack when the sphere is subjected to heat. Ideally, the inner layers should have the same or lower thermal expansion coefficient as the outer layers. The aforementioned chemical and physical properties of various casting materials mixtures are well known in the art, and may readily be investigated prior to casting.

The miscibility of the casting materials must also be considered. Many polymers tend to be immiscible in liquid form and will readily separate when subjected to centrifugal force, as described, for example in U.S. Pat. No. 5,385,950. Though certain metal combinations are immiscible in both their liquid and solid phases, many metals will form alloys when their molten phases are mixed. Centrifugal separation of alloys may be accomplished by selecting a hypereutectic alloy whose higher melting point constituent A will nucleate before its lower melting point constituent B. By applying centrifugal force to the alloy at a temperature between its liquidus and solidus points, nucleated particles with a relatively high concentration of constituent A will be segregated from the liquid phase according to density. Upon cooling below the solidus, the remaining liquid phase will solidify as an alloy containing a relatively high concentration of constituent B. Such centrifugal alloy separation techniques are known in the art and disclosed, for example, in U.S. Pat. Nos. 6,695,936 and 5,303,682. Depending on the properties of the materials used, extended exposure to high centrifugal forces may be required to cause density separation of nucleated hypereutectic alloys.

Centrifugal casting of gradient density spheres may also be accomplished by introducing solid particles of a casting material C into a molten casting material D within the mold, where casting material C has a higher melting point than casting material D. Application of centrifugal force will cause the solid particles of material C to segregate from the liquid material D according to density. Once the casting materials are separated, and while maintaining centrifugal force, heat may be applied to the mold to increase the temperature of the mixture above the melting point of material C. This will cause material C to sinter and form a contiguous layer. Subsequent cooling under maintained centrifugal force will yield a stratified sphere with denser outer layers. Where material C is denser than material D, material C will form the outer layer. Where material C is less dense than material D, material D will form the outer layer. When selecting an appropriate mold size, care should be taken to anticipate the liquid and solid volumes of the casting materials, giving any necessary allowance for the expansion of solid casting material C if it is intended to liquefy material C within the mold.

Further Valve Systems

FIGS. 13A-13D show an alternative valve structure 700 for use with the spherical molds described above. FIG. 13A is a cross-section view of valve body structure 710. FIG. 13B is a cross-sectional and partially schematic view of the valve structure 700 without valve body 710. FIG. 13B also includes a top plan view of valve guide structure 714. FIG. 13C is a cross-sectional and partially schematic view of the fully assembled valve structure 700. As it is shown in FIG. 13C, the tip of a nozzle 702 is shown above the valve structure 700, poised to descend downwardly to open the valve and either extract air or deliver casting materials through passages 728 to be communicated with the valve structure 700, as it will be described in greater detail below.

The valve structure 706 is designed to mate with a valve seat 704 in the wall 100 of one hemisphere of the spherical mold. The seat 704 has a diameter that diminishes at increasing radial distances from the center of the sphere. The valve seat 704 thus provides a support surface against which centrifugal force will hold the valve closure member 706 tightly sealed against the seat during rotation of the spherical mold.

The valve 700 also includes a valve stem 708 and a valve body structure 710 which forms a receptacle for the nozzle tip 702 at the top, and a retainer structure for a compression spring 712. A valve guide member 714 is provided with a central opening 721 (FIG. 13B) through which the valve stem 708 moves upwardly and downwardly. The valve guide 714 has a bottom rim 718 (also see FIG. 13B) which is secured to the outside surface of the mold wall 100. A keeper structure 716 is provided to hold the valve body 710 against centrifugal force. It also is secured to the outside surface of the mold.

As it is shown in FIG. 13B, the valve guide 714 has a plurality of axial holes 720 for guiding liquids or gases to or from the nozzle 702 through the valve. The upper wall of the receptacle 710 has a plurality of holes 726 of approximately the same size as the holes 720 and which are positioned to be aligned with the holes 720 and the passages 728 in the nozzle to form fluid delivery passages between the nozzle 702 and the interior of the mold.

The valve 700 shown in FIG. 13C is closed. FIG. 13D shows the valve structure when the valve is open. The valve is opened by bringing the nozzle tip 702 downwardly and pressing it against the top of the valve structure in the receptacle for the nozzle in the top of the structure. As it is shown in FIG. 13A, a gasket 729 is provided to form a gas and liquid-tight seal between the nozzle tip and the valve structure. Similar seals can be provided elsewhere in order to prevent the leakage of gases or liquids passing through the valve structure.

As it is shown in FIG. 13D, when the valve closure element 706 is pressed downwardly by the nozzle 702 against the resistance of the spring 712, a passage is formed to allow fluids and gas 715 to pass through the valve, past the valve seat 704 and the closure element 706 and into or out of the mold.

When the nozzle 702 has finished delivering fluid materials or extracting gases from the mold, it is lifted away from the valve receptacle and returns to a position such as that shown in FIG. 13C, so that the spherical mold can be rotated during the molding process.

Figure 14A:
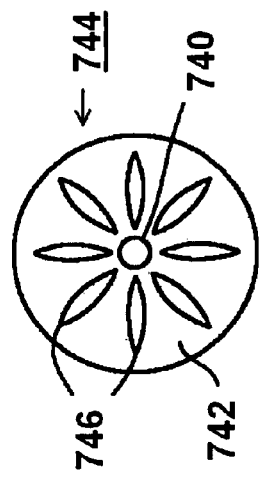
FIGS. 14A-14D are schematic cross-sectional and other views of another alternative valve structure for use in the invention.
Figure 14B:
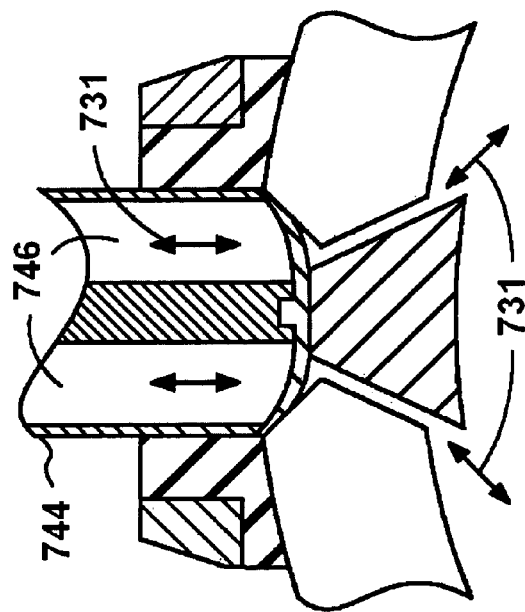
Figure 14C:
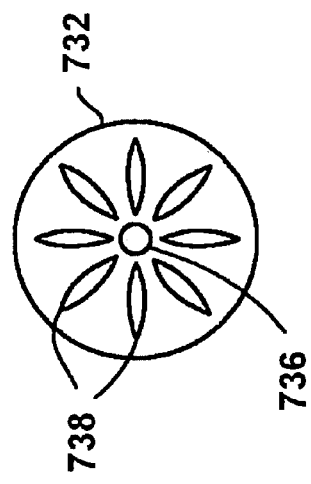

FIGS. 14A-14D show an alternative valve arrangement. As shown in FIG. 14B, a valve closure element 730 engages a valve seat 734 to close the valve.

Figure 14D:
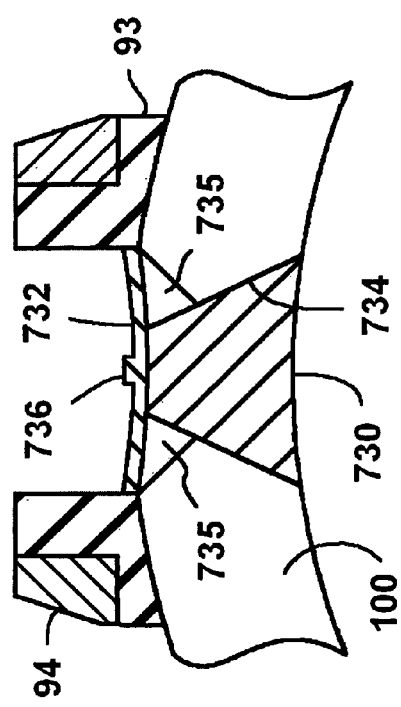

Instead of the spring structures shown in FIG. 13A-13D, a circular leaf spring 732 with an upstanding projection 736 in the center is used as a return spring for the valve closure member 730. The projection 736 is adapted to mate with a corresponding cavity 740 in the tip 742 of a nozzle 744 which is shown in FIG. 14D pressed downwardly against the spring 732 so as to flex it to open the valve. When the nozzle is removed, the spring 732 returns the closure member 730 to its seat, 734.

As shown in FIG. 14A, holes 738 are provided in the spring 732 to match with holes 746 (FIG. 14C) in the tip 742 of the nozzle 744, and the nozzle 744 is aligned so that the holes 746 and 738 will register with one another to provide continuous passageways for the flow of gases and liquids 731 between the nozzle and the interior of the mold.

A beveled recess 735 (FIG. 14B) is provided in the outside surface of the mold wall 100 to accommodate the downward flexure of the spring 732 to the position shown in FIG. 14D.

In FIG. 14B, the spring 732 is shown moderately flexed when the valve is seated so as to provide a strong bias to hold the valve shut until opened by the thrust of the nozzle tip 742.

As in the valve structure shown in FIGS. 13A-13D, the valve closure member 730 is seated against the valve seats 734 more forcefully by the centrifugal force which spins the mold so that the possibility of leakage is minimized.

The valve structure shown in FIGS. 14A-14D is considerably simpler than that shown in FIGS. 13A-13D and may simplify balancing the spherical mold to promote smooth rotation.

The foregoing features of the invention are further described as follows:

1. A method of casting a hollow spheroid having an internal pressure below ambient, said method comprising:
   (a) providing a mold having a hollow spherical interior, said mold having a valve capable of communicating with said hollow spherical interior,
   (b) introducing casting material into said hollow spherical interior of said mold,
   (c) evacuating gas from said hollow spherical interior of said mold through said valve,
   (d) centrifugally spinning said mold about two substantially perpendicular axes intersecting at the center of said hollow spherical interior of said mold until said casting material has been spread about the surface of said hollow spherical interior of said mold,
   (e) heating said casting material,
   (f) cooling said casting material after said heating step,
   (g) causing said casting materials to harden, and
   (h) removing the resulting spheroid from said mold.
2. A method as in paragraph 1 in which said hollow spherical interior of said mold, during said cooling step, contracts by a degree selected from the group consisting of (A) less than and (B) to the same degree as said resulting spheroid.

3. A method as in paragraph 1 wherein the rates of rotation about both of said axes of said mold are substantially the same.
4. A method as in paragraph 1 wherein the rate of rotation about one of said axes is increased and decreased periodically relative to the rate of rotation about the other of said axes.
5. A method of casting a spheroid having a gradient internal density, said method comprising:
   (a) providing a mold having a hollow spherical interior, with a valve communicating with said hollow spherical interior of said mold, and using said valve to perform an action selected from the group consisting of
      (A) removing gas from said hollow spherical interior of said mold, and
      (B) introducing at least one of said casting materials into said hollow spherical interior of said mold,
   (b) introducing into said hollow spherical interior of said mold selected quantities of two or more casting materials, each of said casting materials being selected from the group consisting of (A) liquid casting materials and (B) solid casting materials which will be at least partially melted within said mold;
   (c) centrifugally spinning said mold about two substantially perpendicular axes intersecting at the center of said mold until said casting materials have been at least partially separated by centrifugal force;
   (d) causing said casting materials to harden; and
   (e) removing the resulting gradient density spheroid from said mold.
6. The method of paragraph 5 including the additional step of evacuating from said mold enough gas to accommodate gases emitted inside said hollow spherical interior of said mold during casting.
7. The method of paragraph 5, including the additional steps of heating and cooling said casting materials.
8. The method of paragraph 7 in which said hollow spherical interior of said mold, during said cooling step, contracts by a degree selected from the group consisting of (A) less than and (B) to the same degree as said resulting spheroid.
9. The method of paragraph 7 in which said mold contracts during said cooling step to an extent sufficient to minimize unwanted thermal contraction cavities within said resulting gradient density spheroid.
10. The method of paragraph 5 wherein the rates of rotation about both of said axes of said mold are substantially the same.
11. The method of paragraph 5 wherein the rate of rotation about one of said axes is increased and decreased periodically relative to the rate of rotation about the other of said axes.
12. A device for centrifugally casting a spheroid, said device comprising
   (a) a support structure;
   (b) a frame mounted on said support structure, said frame being capable of rotating about a primary axis;
   (c) a mold with a hollow spherical interior, said mold being rotatably mounted on said frame, with the center of said hollow spherical interior of said mold located on said primary axis;
   (d) said mold being capable of rotating on said frame about a secondary axis passing through the center of said hollow spherical interior of said mold, said secondary axis being substantially perpendicular to said primary axis;
   (e) said hollow spherical interior of said mold being capable of containing casting material;
   (f) a drive mechanism for rotating said mold about said secondary axis while said frame is simultaneously rotated about said primary axis; and
   (g) at least one valve located on said mold, said valve communicating with said hollow spherical interior of said mold, and said valve adapted to selectively allow the entry of fluent materials into or the escape of fluent materials from said hollow spherical interior of said mold, wherein said frame is dynamically stabilized.
13. The device of paragraph 12 wherein a counterweight is attached to said mold to balance said mold during rotation of said mold, said counterweight being selected from the group consisting of:
   (a) a valve;
   (b) a dead weight.

It should be understood that certain variations and modifications of this invention will suggest themselves to one of ordinary skill in the art. The scope of the present invention is not to be limited by the illustrations or the foregoing descriptions thereof, but rather solely by the appended claims.

The invention claimed is:
1. A device for centrifugally casting spheroids, said device comprising:
   (a) a support structure;
   (b) a frame capable of being mounted on said support structure, said frame being capable of rotation about a primary axis;
   (c) a plurality of molds, said molds mountable on said frame in a straight line along said primary axis, each of said molds having a first and second rotational mounting point on opposite sides of each of said molds, each of said molds mountable on said frame at said first and second rotational mounting points, each of said molds having mold walls forming a hollow spherical interior, said hollow spherical interior having an inner surface, and the center of each of said hollow spherical interiors of said molds located on said primary axis;
   (d) said frame having a first side configured to meet said first rotational mounting points, and a second side configured to meet said second rotational mounting points
   (e) said hollow spherical interiors of said molds being capable of containing casting material;
   (f) said molds being separable such that said hollow spherical interiors may be opened into hemispheres;
   (g) said molds being capable of being caused to rotate about said primary axis by said rotation of said frame;
   (h) said molds being capable of rotating on said frame about secondary axes passing through the center of each of said hollow spherical interiors of said molds, said secondary axes each being substantially perpendicular to said primary axis, and said secondary axes passing through said first and second rotational mounting points of each of said molds;
   (i) a primary drive motor for rotating said frame about said primary axis;
   (j) each of said molds having one or more mold gears, and said mold gears being driveably couplable among said molds from each one of said molds to the adjacent one of said molds such that the rotation of any one of said molds is transferred to said adjacent one of said molds;
   (k) a drive gear system couplable to one or more of said mold gears to rotate said molds about said secondary axes while said frame is rotated about said primary axis, wherein said drive gear system includes a set differential gears configured to connect said drive gear system to a source of rotation to drive said drive gear system;

(l) wherein, for each of said molds, said mold has a neck configured for meeting said frame at at least one of said first and second rotational mounting points, said neck configured to be centered on said secondary axis and to extend from said mold toward said frame, said neck having a neck surface configured to encircle said secondary axis at an angle to said secondary axis, and said frame having a circular rotary mount configured to be centered on said secondary axis and rotationally engagable with said neck surface, wherein said rotary mount is configured to be able to transfer an axial load to said neck substantially parallel to said secondary axis, and wherein said rotary mount is configured to be able to allow said mold to rotate continuously about said secondary axis while said axial load is applied;

(m) wherein said device is configurable for operation such that, for each one of said molds, the combination of (A) said mold and (B) what is attached to said mold that rotates about said secondary axis of said mold, has its center of mass located substantially at the center of said hollow spherical interior of said mold;

(n) wherein said device is configurable for operation such that the combination of (C) said frame and (D) what is attached to said frame that rotates about said primary axis, exclusive of said support structure and elements (A)-(B), also has its center of mass located substantially on said primary axis.

2. The device of claim 1 wherein each of said molds has a valve located on said mold, said valve substantially centered along said secondary axis and communicating with said hollow spherical interior of said mold, said valve adapted to selectively allow the entry of fluent materials into or the escape of fluent materials from said hollow spherical interior of said mold.

3. The device of claim 2 wherein each of said molds possesses a second of said valves located on the opposite side of said mold and substantially centered on said secondary axis.

4. The device of claim 1 including an induction heating system capable of heating said casting material within said molds, wherein said induction heating system includes a single conductive wire turned in coils about each of said molds within said frame and capable of rotating with said molds about said primary axis, and wherein said conductive wire has a first end that forms a rotary electrical contact with a source of electricity outside of said frame.

5. The device of claim 1 wherein, for each of said molds, said hemispheres of said molds are capable of separation along said secondary axis to permit the release of one of said spheroids, and a segment of at least one of said first or second sides of said frame may be separated from the remainder of said frame to allow said separation, and wherein said segment is releasably connected to the other of said sides of said frame by a tightenable structure, said tightenable structure capable of being selectively tightened to apply a desired amount of pressure to said mold walls of said one of said molds.

6. The device of claim 1 wherein said mold walls contain a refractory metal oxide selected from the group consisting of (A) magnesium oxide and (B) zirconium dioxide.

7. The device of claim 1 including a second drive motor for engaging said drive gear system to rotate said molds about said secondary axis, and wherein said second drive motor is located at a location that does not rotate with said frame.

8. The device of claim 1 wherein said inner surface of said hollow spherical interior of at least one of said molds has a surface contour for the purpose of creating a correspondingly shaped contour on the surface of said spheroid, said surface contour selected from the group consisting of (A) a projection from said inner surface of said hollow spherical interior of said one of said molds and (B) an indentation in said inner surface of said hollow spherical interior of said one of said molds.

9. The device of claim 1 wherein, for each of said molds, said one or more mold gears comprise an equatorial gear encircling the circumference of said mold about said secondary axis.

10. The device of claim 9 wherein each of said equatorial gears is interlocked with the equatorial gear of the adjacent one of said molds such that each of said molds rotates in the opposite direction of the one of said molds adjacent to it.

11. The device of claim 4 wherein said conductive wire comprises hollow tubing capable of carrying a fluent material, and wherein said first end is connected by a rotary tubular connection at said primary axis to a source of fluent material outside of said frame, and wherein fluent material may be pumped through said induction heating system when said frame is rotating about said primary axis.

12. The device of claim 11 wherein said conductive wire has a second end that terminates opposite said frame from said first end at a second rotary tubular connection at said primary axis that allows passage of fluent material when said device is rotating about said primary axis.

13. The device of claim 1 wherein, for each of said molds, the intersection of said primary and secondary axes of said mold when said device is at rest define a point in space, and wherein said device is capable of generating centrifugal forces of 10 Gs along said inner surface of said hollow spherical interior of said mold while also allowing said mold to remain substantially centered on said point in space while said mold is rotating about both said primary and said secondary axes.

14. The device of claim 1 wherein said device is configurable for operation such that if an imaginary plane perpendicularly bisects said secondary axes through said centers of each of said molds, the portions of elements (C)-(D) residing on one side of said imaginary plane, exclusive of said set of differential gears, are substantially bilaterally symmetric with the portions of elements (C)-(D), exclusive of said set of differential gears, residing on the opposite side of said imaginary plane.

15. The device of claim 1 wherein said device is configurable for operation such that if an imaginary plane perpendicularly bisects said secondary axes through said centers of each of said molds, the portions of elements (A)-(D) residing on one side of said imaginary plane, exclusive of said set of differential gears, are substantially bilaterally symmetric with the portions of elements (A)-(D), exclusive of said set of differential gears, residing on the opposite side of said imaginary plane.

16. The device of claim 3 wherein said device is configurable for operation such that if an imaginary plane perpendicularly bisects said secondary axes through said centers of each of said molds, the portions of elements (C)-(D) residing on one side of said imaginary plane, exclusive of said set of differential gears, are substantially bilaterally symmetric with the portions of elements (C)-(D), exclusive of said set of differential gears, residing on the opposite side of said imaginary plane.

17. The device of claim 3 wherein said device is configurable for operation such that if an imaginary plane perpendicularly bisects said secondary axes through said centers of each of said molds, the portions of elements (A)-(D) residing on one side of said imaginary plane, exclusive of said set of differential gears, are substantially bilaterally symmetric with the portions of elements (A)-(D), exclusive of said set of differential gears, residing on the opposite side of said imaginary plane.

18. The device of claim 2 wherein, for each of said molds, the intersection of said primary and secondary axes of said mold when said device is at rest define a point in space, and wherein said device is capable of generating centrifugal forces of 10 Gs along said inner surface of said hollow spherical interior of said mold while also allowing said mold to remain substantially centered on said point in space while said mold is rotating about both said primary and said secondary axes.

19. The device of claim 3 wherein, for each of said molds, the intersection of said primary and secondary axes of said mold when said device is at rest define a point in space, and wherein said device is capable of generating centrifugal forces of 10 Gs along said inner surface of said hollow spherical interior of said mold while also allowing said mold to remain substantially centered on said point in space while said mold is rotating about both said primary and said secondary axes.

20. The device of claim 15 wherein, for each of said molds, the intersection of said primary and secondary axes of said mold when said device is at rest define a point in space, and wherein said device is capable of generating centrifugal forces of 10 Gs along said inner surface of said hollow spherical interior of said mold while also allowing said mold to remain substantially centered on said point in space while said mold is rotating about both said primary and said secondary axes.

21. The device of claim 17 wherein, for each of said molds, the intersection of said primary and secondary axes of said mold when said device is at rest define a point in space, and wherein said device is capable of generating centrifugal forces of 10 Gs along said inner surface of said hollow spherical interior of said mold while also allowing said mold to remain substantially centered on said point in space while said mold is rotating about both said primary and said secondary axes.

22. The device of claim 2 including a second drive motor for engaging said drive gear system to rotate said molds about said secondary axis, and wherein said second drive motor is located at a location that does not rotate with said frame.

23. The device of claim 3 including a second drive motor for engaging said drive gear system to rotate said molds about said secondary axis, and wherein said second drive motor is located at a location that does not rotate with said frame.

24. The device of claim 15 including a second drive motor for engaging said drive gear system to rotate said molds about said secondary axis, and wherein said second drive motor is located at a location that does not rotate with said frame.

25. The device of claim 17 including a second drive motor for engaging said drive gear system to rotate said molds about said secondary axis, and wherein said second drive motor is located at a location that does not rotate with said frame.

* * * * *